Dec. 24, 1957  R. W. ANNESS  2,817,197
CAN PACKAGING APPARATUS
Filed Feb. 3, 1956  13 Sheets-Sheet 1
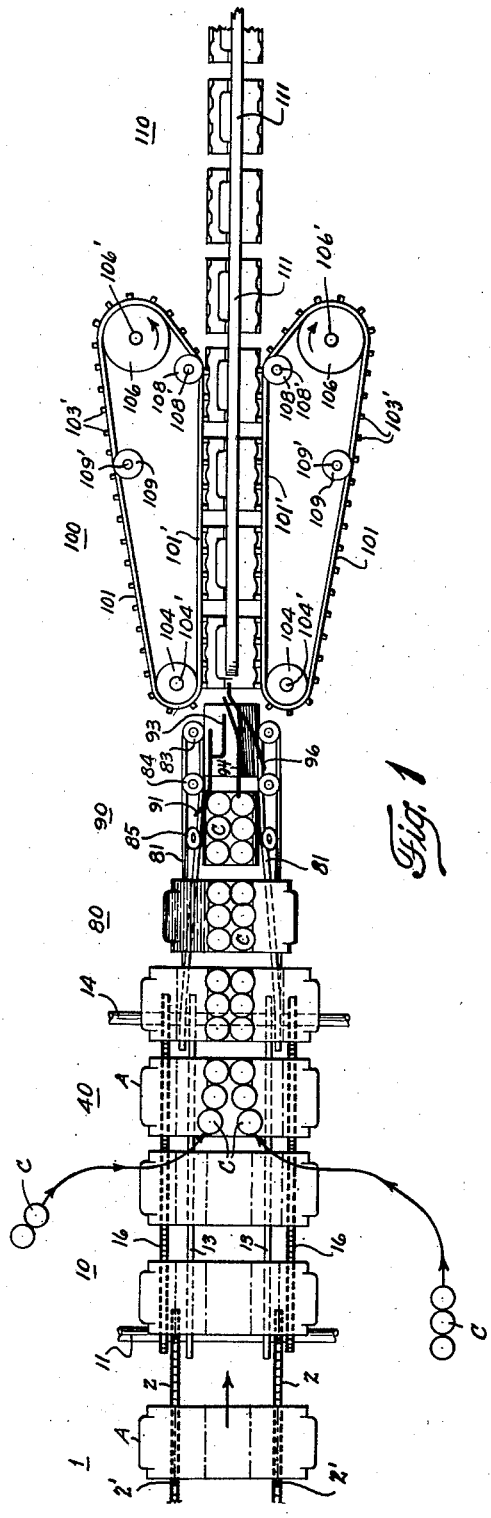
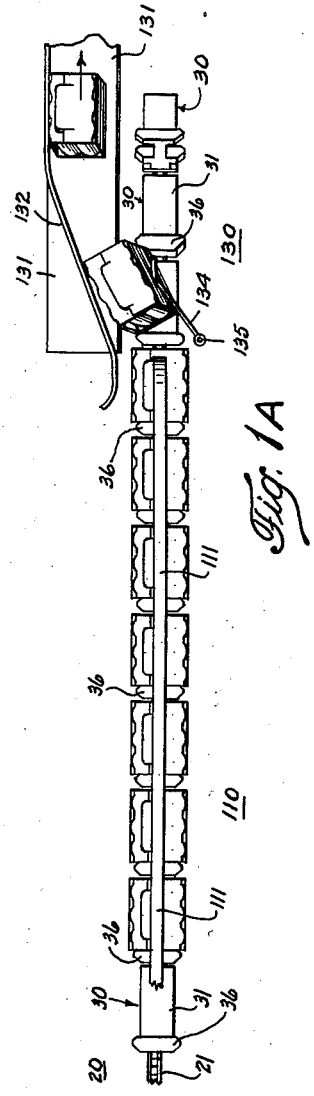
INVENTOR.
RUSSELL W. ANNESS
BY
Reuben T. Carlson
ATTORNEY.

INVENTOR.
RUSSELL W. ANNESS
BY
Reuben J. Carlson
ATTORNEY.

INVENTOR.
RUSSELL W. ANNESS
BY
ATTORNEY

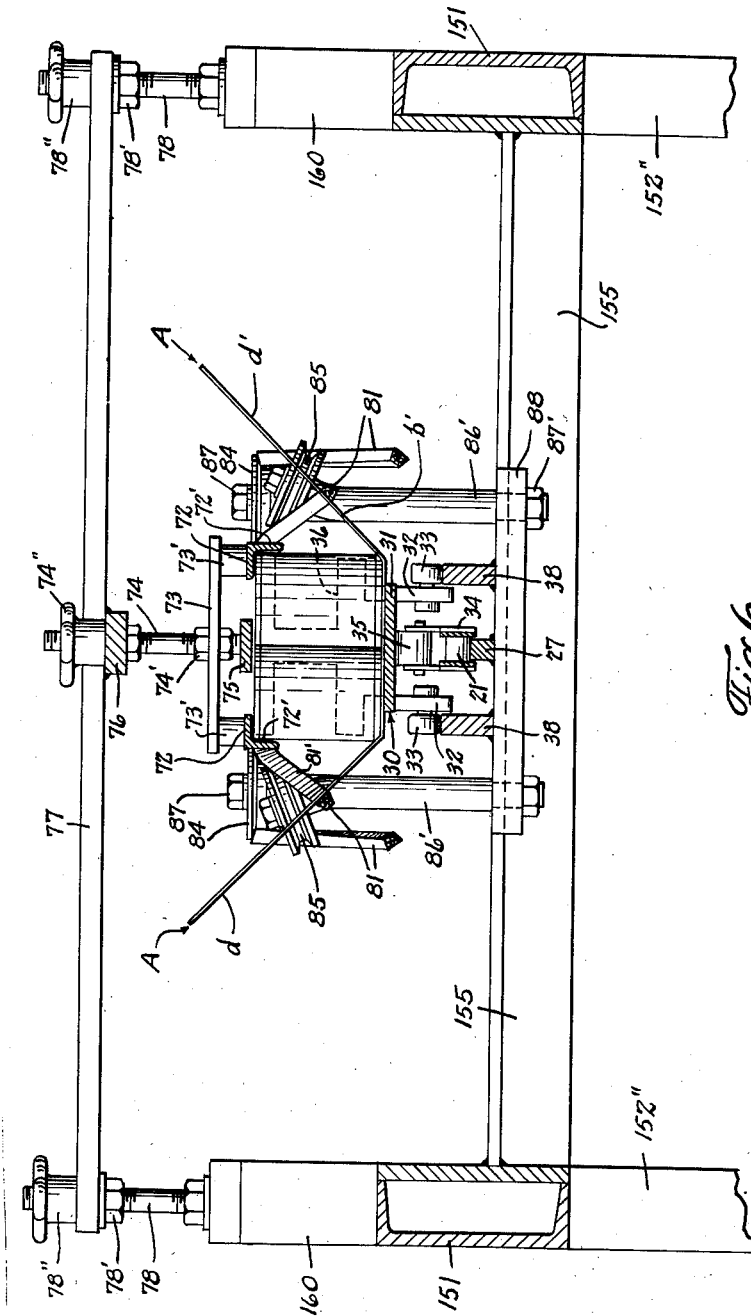

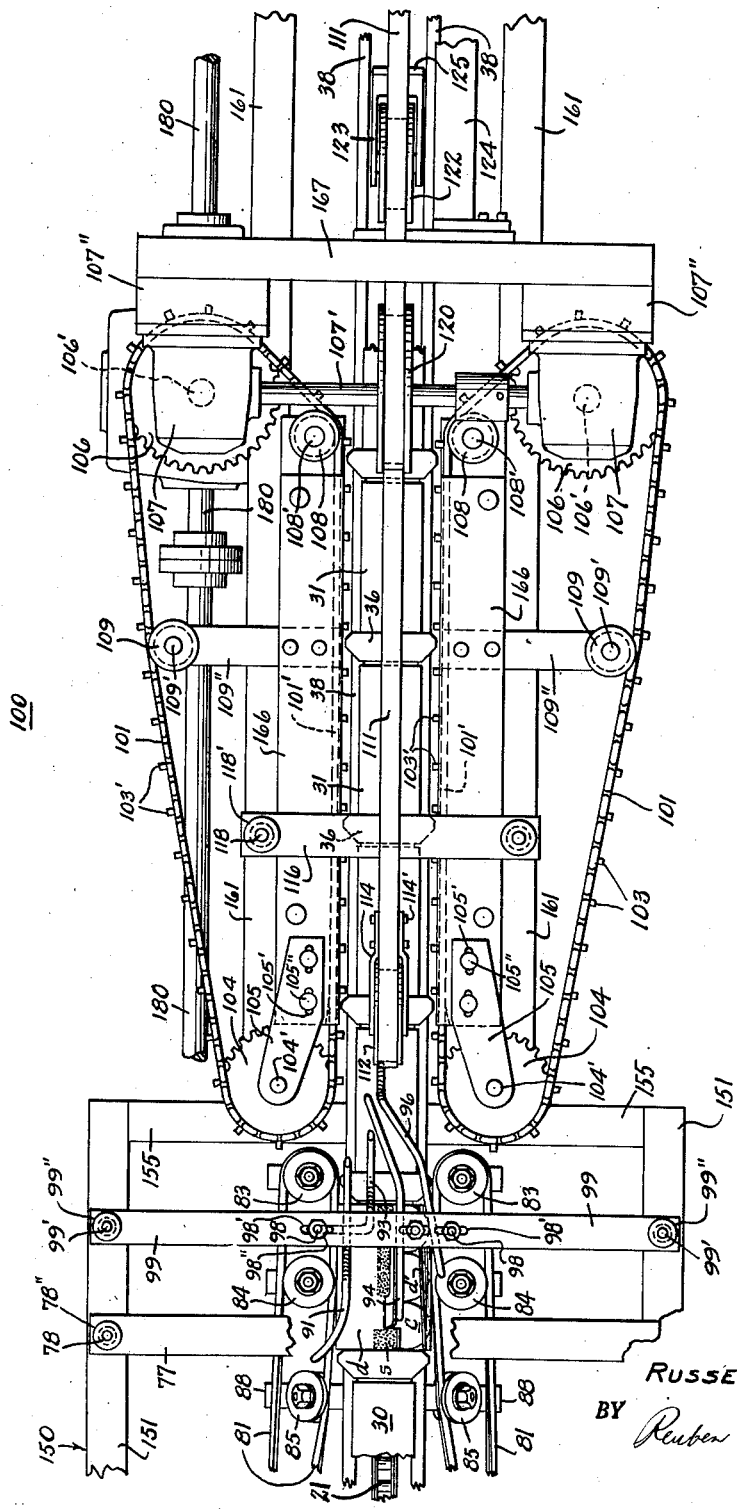

Dec. 24, 1957  R. W. ANNESS  2,817,197
CAN PACKAGING APPARATUS
Filed Feb. 3, 1956  13 Sheets-Sheet 8
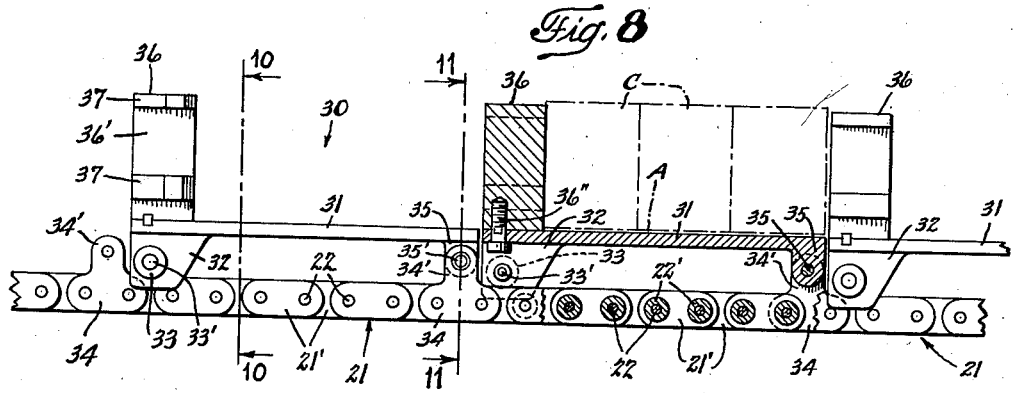
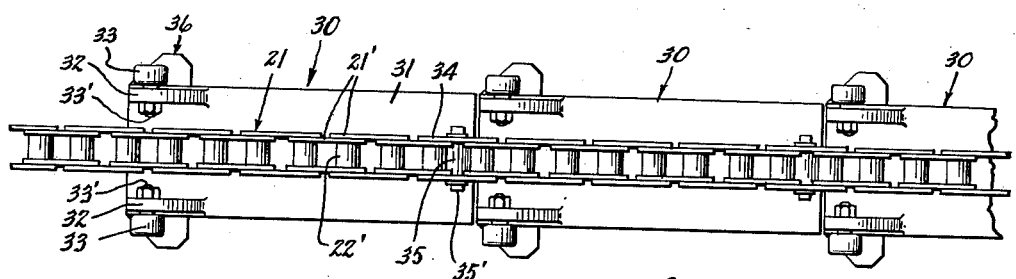
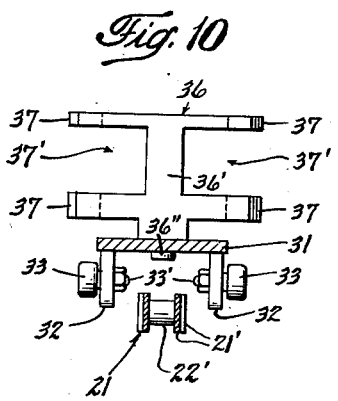
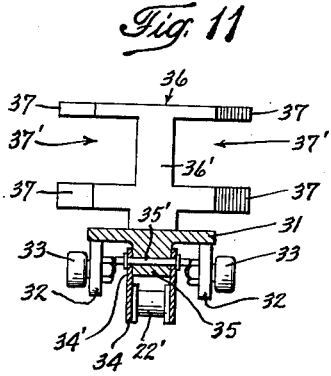
INVENTOR.
RUSSELL W. ANNESS
BY
Reuben T. Carlson
ATTORNEY.

Dec. 24, 1957  R. W. ANNESS  2,817,197
CAN PACKAGING APPARATUS
Filed Feb. 3, 1956  13 Sheets-Sheet 9

INVENTOR.
RUSSELL W. ANNESS
BY Reuben J. Carlson
ATTORNEY.

INVENTOR.
RUSSELL W. ANNESS
BY
ATTORNEY.

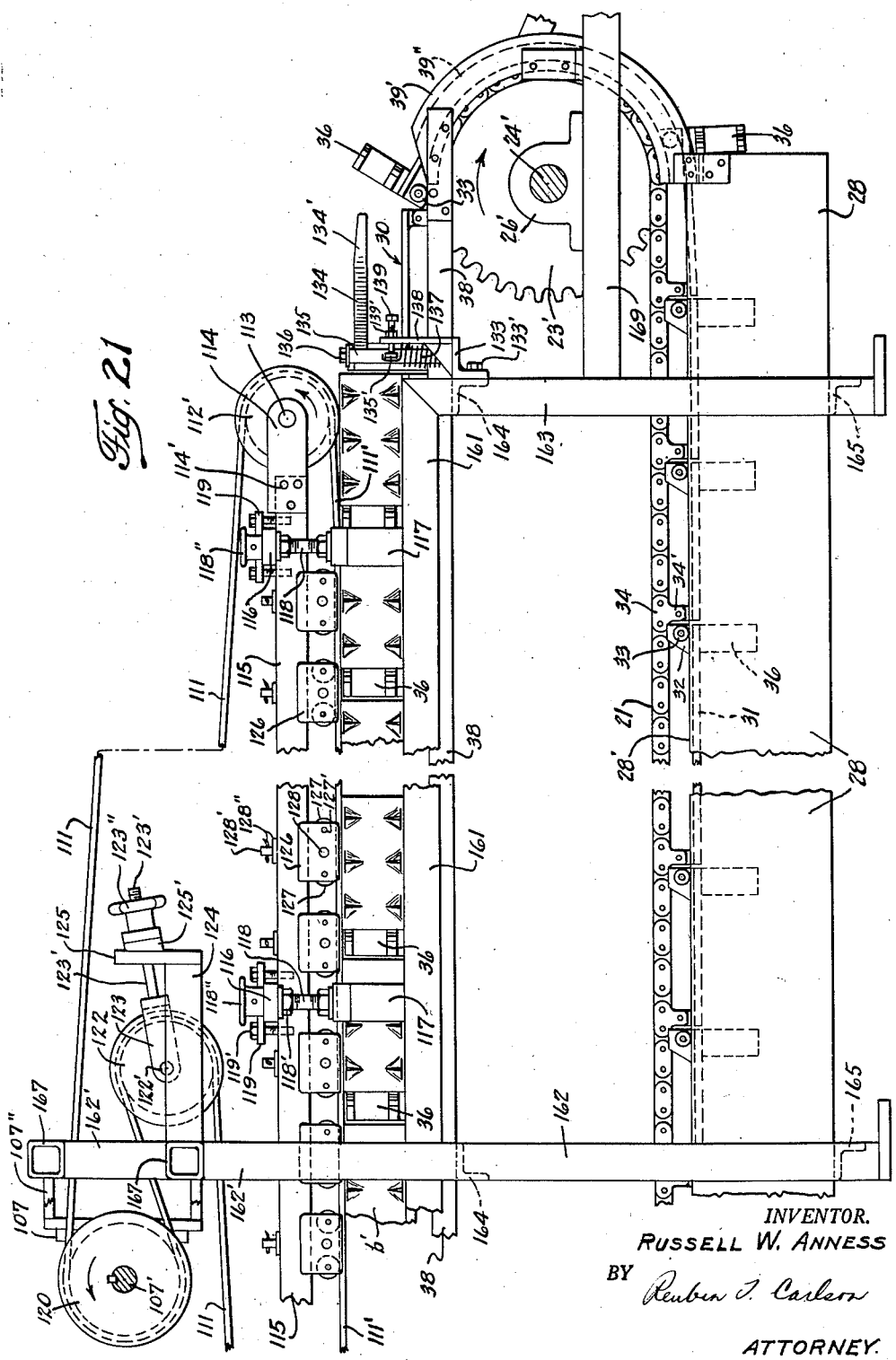

Dec. 24, 1957  R. W. ANNESS  2,817,197
CAN PACKAGING APPARATUS
Filed Feb. 3, 1956  13 Sheets-Sheet 12
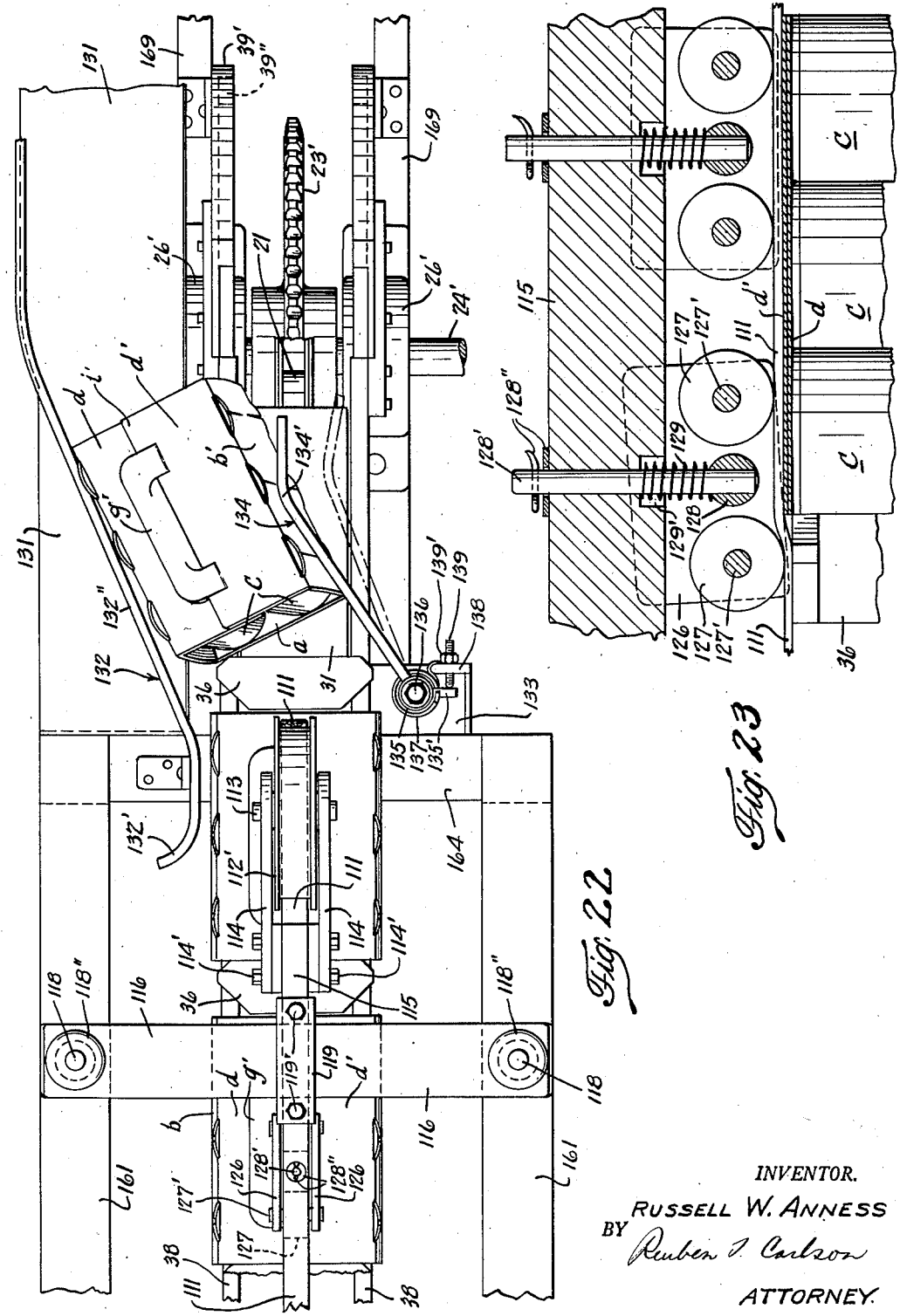
INVENTOR.
RUSSELL W. ANNESS
BY
*Reuben I. Carlson*
ATTORNEY.

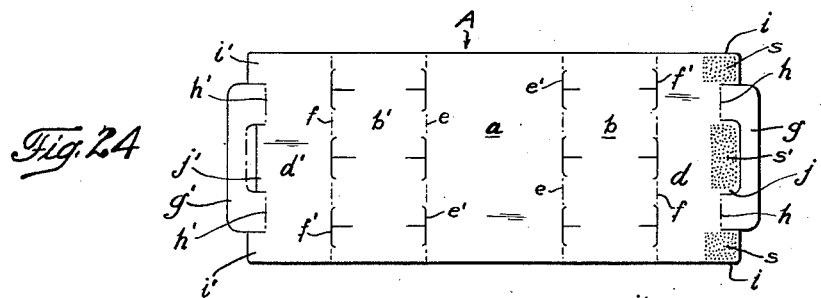
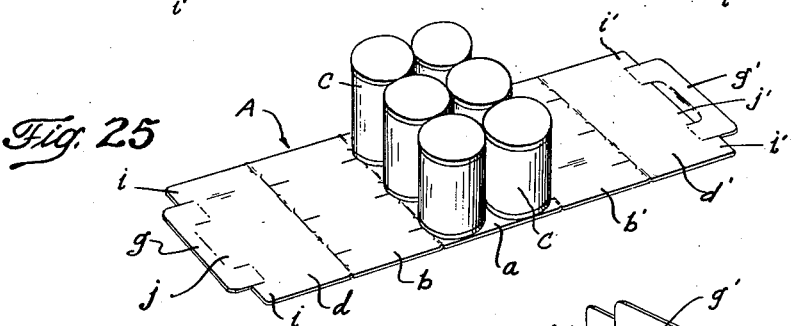
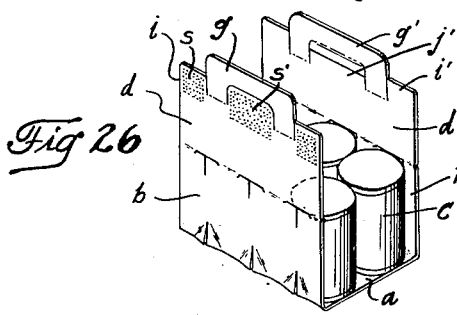
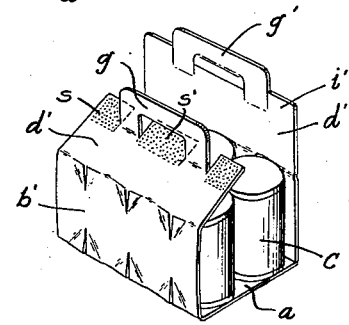
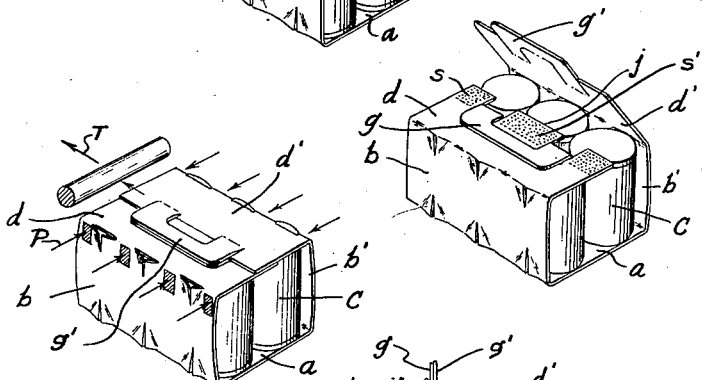
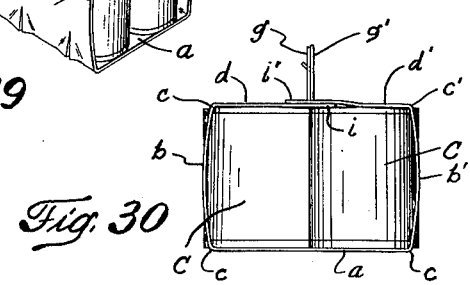
INVENTOR.
RUSSELL W. ANNESS
BY
ATTORNEY.

United States Patent Office

2,817,197
Patented Dec. 24, 1957

2,817,197

CAN PACKAGING APPARATUS

Russell W. Anness, Middletown, Ohio, assignor to The Gardner Board and Carton Co., Middletown, Ohio, a corporation of Ohio Application February 3, 1956, Serial No. 563,269

30 Claims. (Cl. 53—48)

This invention relates to can packaging apparatus designed to apply preformed wrapper blanks in embracing relation around successive can groups and to secure overlapped portions of the wrapper blanks together in a manner to firmly lock the can groups within the can packages as thus formed.

The apparatus of this invention is designed to assemble one or more rows of similar cans into compact can groups during continuous travel thereof and to tightly enclose the successive can groups within preformed wrapper blanks in a manner to prevent removal of the cans from the can packages as thus formed without first breaking and lacerating the can embracing wrapper blanks. This apparatus can be effectively used for the tight packaging of can groups composed of uniform diameter cans as well as cans having laterally projecting chimes at the top and bottom ends thereof.

The wrapper blanks supplied to this apparatus are so formed that the blank bottom panel is of slightly lesser transverse width than the transverse bottom end width of the can group when snugly seated thereon, so that portions of the can bottom rims will be projected through conforming slits formed along the lower ends of the blank side panels when the side panels are upfolded by the side panel upfolding devices incorporated into the apparatus of this invention. The top panel forming sections of the blank, when adhesively bonded together in overlapped relation through the agency of devices of this apparatus, will provide a composite top panel whose transverse width is slightly less than the transverse top end width of the can group covered thereby, so that portions of the upper rims of the packaged cans will also project through the conforming slits provided in the upper ends of the blank side panels. Can packages as thus produced have both the lower and upper ends of the packaged cans securely locked within and tightly embraced by the enclosing wrapper blanks so that the cans will remain therein when the can packages are subjected to rough handling.

The apparatus of this invention includes gluing mechanism which applies adhesive patches to one of the blank top panel sections as the blanks are continuously advanced in aligned and predetermined spaced relationship. The apparauts further includes a continuous transportation conveyer to which a series of closely spaced packaging carriers are pivotedly secured. Each carrier includes a follower tree mounted on the platform plate thereof. The adjacent follower trees are longitudinally spaced so as to snugly receive the can groups therebetween. Adjacent follower trees thus provide abutment walls between which the platform supported can groups are snugly compacted in a manner to prevent longitudinal shifting movement of the cans comprising the can group when in process of being enclosed within the wrapper blanks during the upper horizontal run of the packaging carriers.

Interposed between the blank gluing mechanism and the blank and package transportation conveyer is a transfer conveyer which received the glued blanks from the gluing mechanism and rearranges the spacing between the aligned blanks so that they become uniformly deposited in registered relation on the successive blank bottom panel supporting platforms of the packaging carriers as the empty carriers of the transportation conveyer move upwardly around the head sprocket of the conveyer. Each blank supporting platform has a length which closely conforms to the length of the blank bottom panel when positioned in registered relation thereon. The blank side panels and top panel sections are additionally supported in flat extended position by slide channels and slide rails forming a part of the transfer conveyer. Means are also provided to maintain the end edges of the extended blanks, as initially advanced on the packaging carriers, in true alignment and in a manner which prevents upcurling of the end edges thereof, until the can groups have been loaded on the bottom panels thereof.

The apparatus additionally includes a can loading mechanism operative to group the cans supplied thereto into successive spaced sets or rows, with the cans of each row in body contact and with the tail can of a preceding row in predetermined spaced relation to the head can of the following row. The can loading mechanism includes a pair of turret wheels positioned on opposite sides of the transportation conveyer and which are rotated in synchronism with the advanced travel of the upper run of the transportation conveyer. Each turret wheel presents can receiving pockets in the periphery thereof which are so formed as to group a single line of cans into successive can sets, each set constituting a single row of cans to be deposited on each blank bottom panel as supported on the platforms of the adjacently advancing carriers. Positive means are provided for feeding and depositing successive cans in the can grouping pockets of each turret wheel.

A can stripping belt, driven in synchronism with each turret wheel, operates to strip successive can sets from the turret wheel pockets when the can set has been advanced thereby to a position directly adjacent the side edge of the advancing carrier, and to laterally push the aligned can set into seated position on the adjacent blank bottom panel supported on the packaging carrier as it advances between the turret wheels. Where twin rows of cans are to be packaged, two turret wheels and associated can stripping belts are employed which are so synchronized as to transversely align the cans of the twin rows on the blank bottom panel as deposited between the adjacent follower trees of the advancing packaging carriers.

Blank side panel upfolding devices are provided which include a pair of upfolding belts whose inner runs are driven at a speed which conforms to the advance movement of the blank and can loaded carriers. The side panel upfolding belts are so formed and mounted as to upfold the blank side panels over the sides of the can group as seated on the blank bottom panel during continued and uninterrupted advance of the packaging carriers. Top panel infolding devices are also provided which include a series of folding rods operative to successively infold the blank top panel sections over the top ends of the can groups. Where the can carrier is provided with handle sections, certain of the folding rods operate to rebend fold one of the handle sections in overlying relation to its top panel section before the companion top panel section is downfolded in overlying relation to the first infolded top panel section.

Immediately prior to the permanent adhesive bonding of the top panel sections, pressure devices associated with the apparatus operate to exert compressive pressure against the upper ends of the blank side panels in a manner to drive adjacent portions of the upper rims of the grouped cans into the conforming slits at the upper ends of the side panels; and additionally, to adjust the overlapping top panel sections so that the transverse widths of the composite top panel will be slightly less than the transverse width of the packaged can group. During continuing advance of the can packages, pressure devices come into play and exert downward sealing pressure against the overlapped top panel sections so as to permanently bond the same into integral union and thus provide a composite top panel whose transverse width is slightly less than the transverse width of the can group packaged therein. The apparatus also includes package kickout devices which laterally remove the completed packages from the transportation carriers without interrupting the continued movement thereof.

Can packaging apparatus constructed in accordance with this invention will operate to package from 100 to 150 can packages per minute. All moving parts are driven in synchronism. The apparatus is fully automatic and operates without manual attention. Can packaging apparatus may be constructed in accordance with this invention to package a single row of cans of any desired number of cans in the row, or twin rows of cans with any desired number of cans in each row. This apparatus is also designed to package cans in wrapper blanks with or without handle sections, and provide tight can locking packages containing cans of the chimeless type, or cans having laterally projecting top and bottom chimes. Can packaging apparatus constructed in accordance with the teachings of this invention is substantially foolproof in operation, and will package various sizes and types of flat ended cans and other flat ended cylindrical objects at high production speeds and at low cost.

Other objects and advantages of this invention will become apparent as the disclosure proceeds.

Although the characteristic features of this invention will be particularly pointed out in the claims, the invention itself, and the manner in which it may be carried out, may be better understood by referring to the following description taken in connection with the accompanying drawings forming a part hereof, in which Figs. 1 and 1A are a diagrammatic plan view of the can packaging apparatus of this invention which generally illustrates the path of travel of the wrapper blanks and the cans into loaded position on the transportation conveyer, the upfolding of the blank side panels over the sides of the blank loaded can group, the infolding and pressure sealing of the top panel sections of the can loaded blank to provide a composite top panel, and the ejection of the completed packages from the apparatus.

Fig. 6 is a fragmentary vertical section taken transversely of the apparatus as the same would appear when viewed along line 6—6 of Fig. 3.

Figure 2:
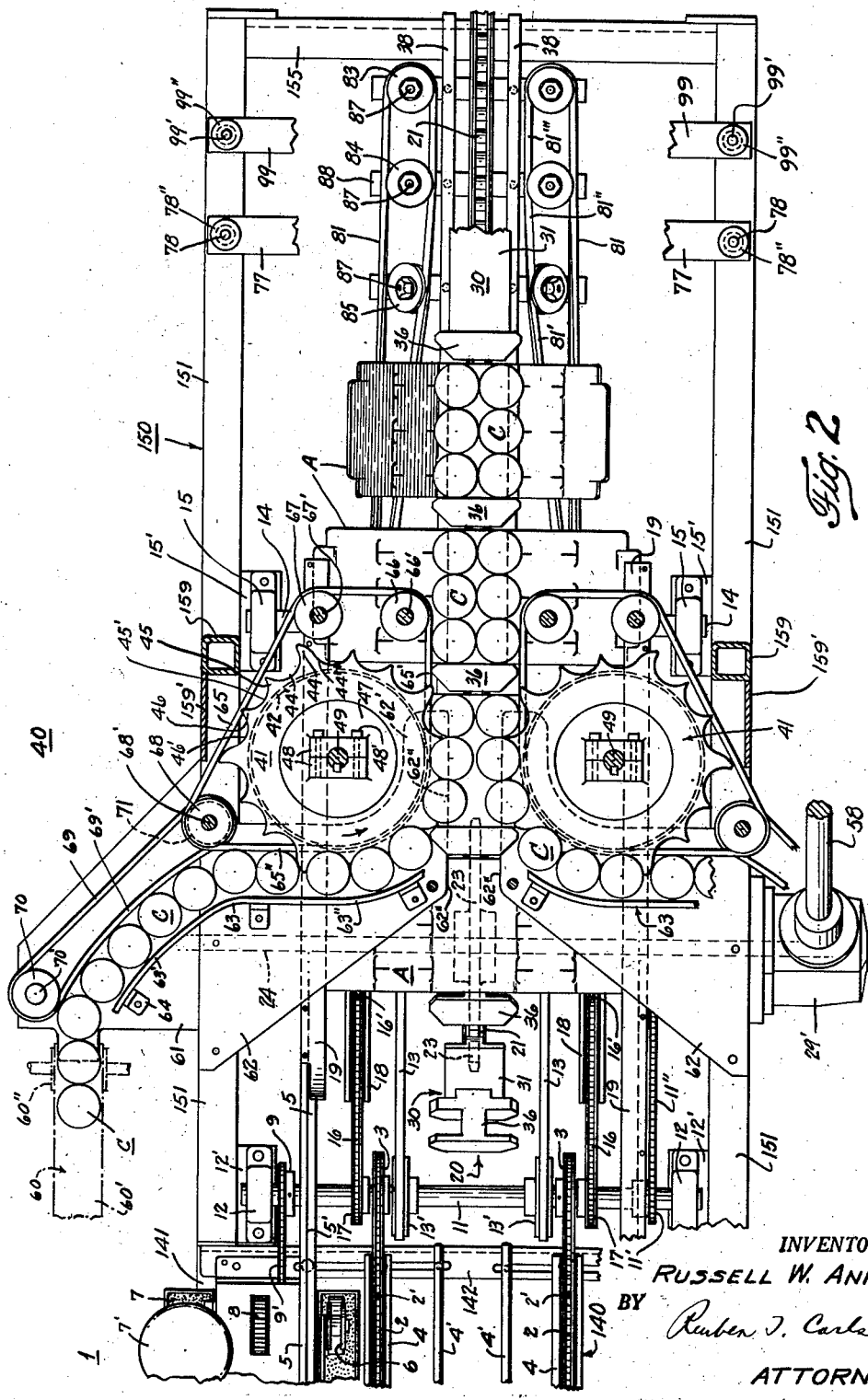
Fig. 2 is a top plan view of a part of the apparatus with certain of the overhead mechanism admitted; this view showing certain details of the blank gluing mechanism, the glued blank transfer conveyer, the blank and package transportation conveyer, the can loading mechanism, and the side panel upfolding devices; certain parts being broken away to reveal structural details.

Fig. 7 is a top plan view of a second part of the apparatus which follows the first part of the apparatus shown in Fig. 2; this view showing further details of the blank top panel infolding devices, the side panel compressing devices, and certain details of the pressure devices which exert sealing pressure against the inturned top panel sections of the assembled can package; certain parts being broken away to reveal structural details.

Fig. 8 is an elevational view, partly in section, of a fragmentary part of the transportation conveyer and its associated packaging carriers.

Fig. 9 is a top plan view showing the underside of a fragmentary part of the transportation conveyer and its associated packaging carriers.

Fig. 10 is a vertical section taken transversely of one of the packaging carriers as the same would appear when viewed in the direction of the arrows 10—10 of Fig. 8.

Fig. 11 is another vertical section taken transversely of the packaging carrier as the same would appear when viewed in the direction of the arrows 11—11 of Fig. 8.

Fig. 12 is a top plan view of a single packaging carrier, this view also showing the outline of a can group seated on the platform thereof and in abutting relation to the follower tree extending from the following end of the platform.

Figure 13:
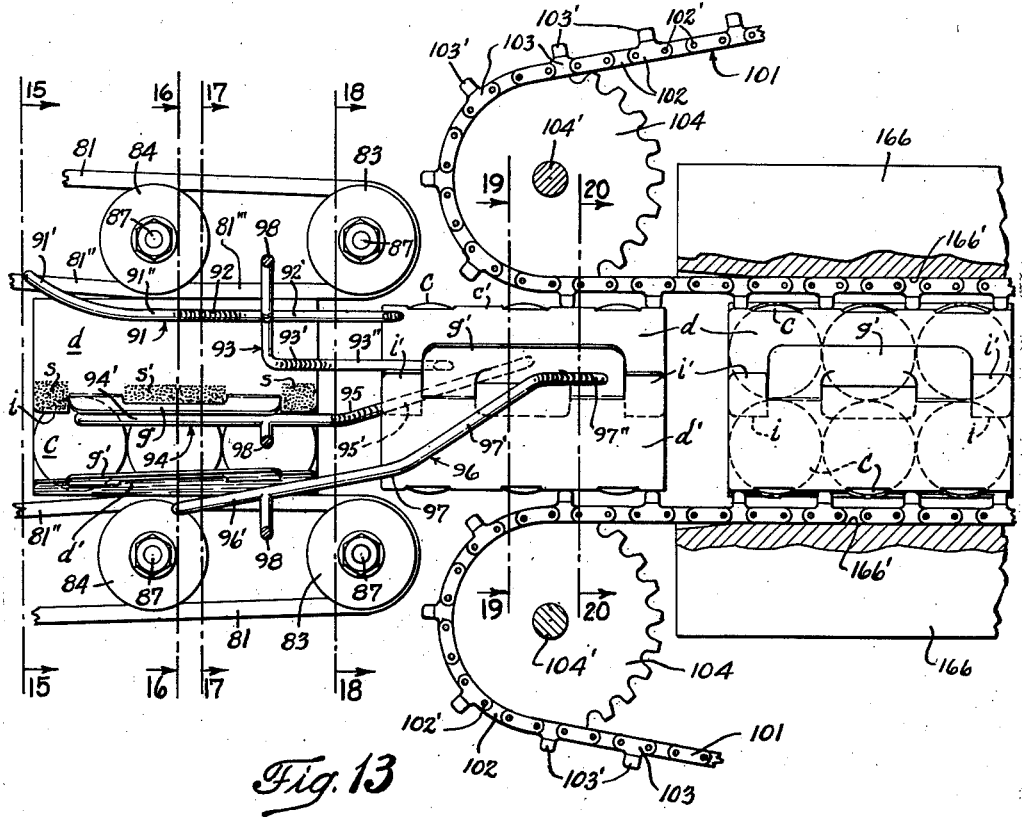

Fig. 13 is an enlarged fragmentary plan view which reveals further details of the blank side panel upfolding devices, the blank top panel infolding devices, and the blank side panel compressing devices of the apparatus.

Figure 14:
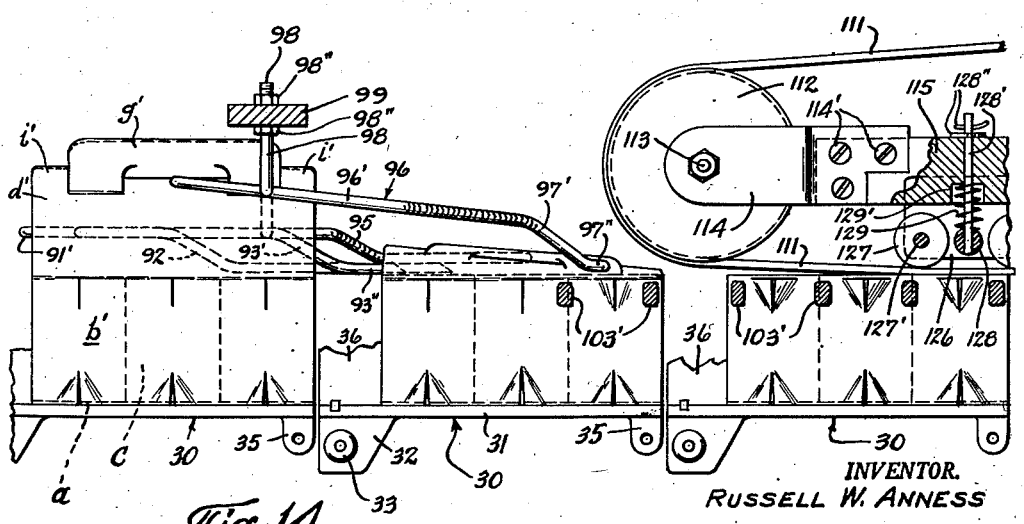

Fig. 14 is a fragmentary vertical section taken longitudinally of that section of the apparatus which is shown in Fig. 13, this view showing a series of successive can packages supported on the packaging carriers of the transportation conveyer, further details of the blank top panel infolding devices, a fragmentary part of the top panel sealing devices also being shown in this view.

Figure 15:
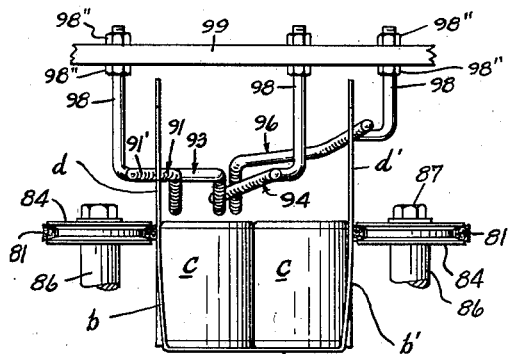

Fig. 15 is a fragmentary vertical section taken transversely of the apparatus as the same would appear when viewed in the direction of the arrows 15—15 of Fig. 13, this view disclosing further details of the blank top panel infolding rods with the top panel sections of the can loaded blank in vertical position.

Figure 16:
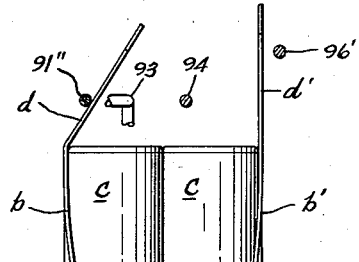

Fig. 16 is a diagrammatic end view of the can package, at a further stage of assembly, this view showing the relative position of the top panel infolding rods when the partly formed can package has arrived at the position indicated by line 16—16 of Fig. 13.

Figure 17:
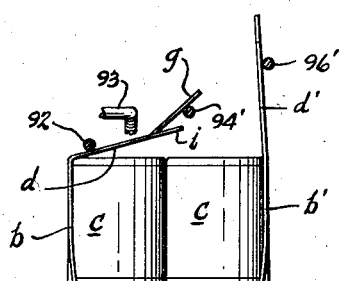

Fig. 17 is a diagrammatic end view of the can package as it would appear at a more advanced stage of assembly, this view showing the relative position of the blank panel infolding rods when the partly formed can package has arrived at the position indicated by line 17—17 of Fig. 13.

Figure 18:
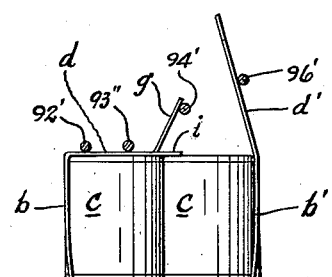

Fig. 18 is a diagrammatic end view of the can package at a still further stage of assembly, this view showing the relative position of the blank top panel infolding rods when the can package has arrived at the position indicated by line 18—18 of Fig. 13.

Figure 19:
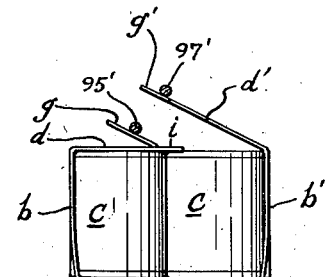

Fig. 19 is another diagrammatic end view of the can package at a further advanced stage of assembly, this view showing the relative position of the top panel infolding rods when the can package has arrived at the position indicated by line 19—19 of Fig. 13.

Figure 20:
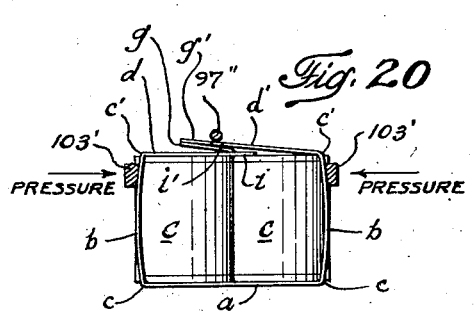

Fig. 20 is another diagrammatic end view of the can package as the same would appear when the top panel sections thereof have been substantially fully infolded into overlapping relationship and as the same would appear when the can package has arrived at the position indicated by line 20—20 of Fig. 13.

Fig. 21 is a vertical section taken longitudinally of that part of the apparatus which is adjacent to the discharge end thereof, this view showing further details of the discharge end of the transportation conveyer, the top panel pressure sealing devices, and the completed package kickout device.

Fig. 22 is a top plan view of that part of the apparatus which is adjacent to the discharge end thereof as shown in Fig. 21, this view disclosing further structural details of the tail end of the transportation conveyer, the top panel sealing devices, and the completed package kickout device.

Fig. 23 is a fragmentary vertical and longitudinal section showing further details of the top panel pressure sealing devices.

Fig. 24 is a perspective view of a typical blank adapted for use in the can packaging apparatus of this invention; this view showing the outside face of the blank uppermost, with glue patches applied to the end extensions and intermediate extension of one of the top panel sections as applied by the blank gluing mechanism of this apparatus.

Fig. 25 is a perspective view showing the inside face of the blank of Fig. 24 and having a can group seated on the bottom panel thereof as effectuated by the can loading mechanism of this apparatus.

Fig. 26 is a perspective view of the can loaded blank as the same would appear after the side panels thereof have been upfolded by the side panel upfolding devices of this apparatus.

Fig. 27 is a perspective view of the can package in process of formation and as the same would appear after one of the top panel sections has been partly infolded and the handle section thereof upfolded by the top panel infolding devices of this apparatus.

Fig. 28 is a perspective view of the partly formed package at a further advanced stage of assembly and as the same would appear after the first top panel section has been substantially fully infolded and its handle section rebent in overlying relation thereto, and with a companion side panel partially infolded; also effectuated by the top panel infolding devices of this apparatus.

Fig. 29 is a perspective view of the can package as the same would appear after both top panel sections have been substantially fully infolded by the top panel infolding devices, and with the side panels undergoing compressive pressure as performed by the side panel pressure devices of the apparatus to thereby effectuate tight packaging and decreased width adjustment of the composite top panel, an operation which is performed immediately prior to the pressure sealing of the top panel sections into integral union; and Fig. 30 is an end view of the completed package showing the manner in which portions of the top and bottom rims of the packaged cans project through the adjacent conforming slits in the wrapper side panels to thereby lock all cans of the can group firmly within the assembled package, this view also showing the handle sections in raised position for carrying purposes.

Similar reference characters refer to similar parts throughout the several views of the drawings and specification.

To exemplify the various forms of wrapper blanks on which the apparatus of this invention is adapted to operate, a typical form of can wrapper blank is shown in Fig. 24 for purposes of illustration. The can wrapper blanks are preferably formed from relatively tough and strong paperboard or fiberboard stock sheets which caliper from eighteen- to forty-thousandths of an inch in thickness, but it will be appreciated that various other fibrous, plastic and metallic sheet materials may be employed to provide the wrapper blanks to be packed on the apparatus of this invention. The wrapper blanks are sized to snugly contain and support the can group when arranged in two closely adjacent rows, each row comprising two, three, four, five, six or more cans as desired. Apparatus may be constructed in accordance with this invention to package can groups comprising a single or a double row of cans of any desired number. For convenience in description, the can packaging apparatus as illustrated in the accompanying drawings has been sized to package can groups of six cans each.

The can wrapper blank A as shown in Fig. 24 presents a bottom panel $a$ designed to snugly support a group of six cans as shown in Fig. 25. A pair of side panels $b$—$b'$ are foldably connected to the opposite side edges of the bottom panel $a$, the height of the side panels $b$—$b'$ being closely equal to the height of the cans C to be packaged in the wrapper blank. An infolding top panel section $d$—$d'$ is connected to each of the side panels $b$—$b'$. A series of aligned and parallel extending score segments $e$ integrally hinge the bottom panel $a$ to the side panels $b$—$b'$. The score segments of each series are separated by spaced cut segments $e'$ which may be of generally arcuate shape. The top panel sections $d$—$d'$ are also integrally hinged to the upper ends of the side panels $b$—$b'$ by a similar series of aligned and parallel extending score segments $f$ which are separated by spaced cuts $f'$, which are also of generally arcuate shape. Thus, when the blanks are shaped into package form as shown in Figs. 29 and 30, relatively narrow slits are formed along the lower and upper edges of the side panels $b$—$b'$ to receive the respective lower and upper peripheral edge portions $c$ and $c'$ of the packaged cans C and thereby lock the individual cans within the wrapper blank.

The bottom panel $a$ has a transverse width as defined between the opposite parallel score segments $e$ which is slightly less than the maximum diameter of the single can, when only a single row of cans is packaged, or the combined maximum diameter of two adjacent transversely arranged cans, when two rows of cans are seated on the bottom panel as shown in Fig. 25. The paired top panel sections $d$—$d'$ each present a handle section $g$—$g'$ foldably connected thereto along fold segments $h$—$h'$. When the package has been assembled as shown in Figs. 29 and 30, the paired handle sections $g$—$g'$ will snugly overlap, with the handle defining score segments $h$—$h'$ in adjacent relation. When so assembled, the width of the top panel as formed by the top panel sections $d$—$d'$, as measured between the top score segments $f$, will be slightly less than the maximum top width of a single can if only one row of cans is packaged, or two adjacent transversely arranged cans if two rows of cans are packaged, so that the opposite upper peripheral edge portions $c'$ of the cans will project through the slits so as to thereby lock the upper ends of the individual cans of the can group firmly within the wrapper blank.

Each of the top panel sections $d$—$d'$ present a pair of end extensions $i$—$i'$ on each side of the legs of the adjacent handle section $g$—$g'$, and an intermediate extension $j$—$j'$ which is captured from material between the legs of the adjacent handle section $g$—$g'$. At least one pair of end extensions $i$ and one of the intermediate extensions $j$ have patches of adhesive $s$—$s'$ applied thereto which bond one pair of end extensions $i$ and the intermediate extension $j$ in lapped relation with respect to the other pair of end extensions $i'$ and other intermediate extension $j'$, as shown in Fig. 29.

The apparatus of this invention is designed to apply patches of adhesive $s$—$s'$ to the end extension $i$ and intermediate extensions $j$ of one of the top panel sections $d$ during continuous travel of the blank. As shown in Fig. 24, the adhesive patches $s$—$s'$ may be applied to the outside face of the extensions $i$ and $j$ while the blank travels with its inside face uppermost, an operation which is performed by the blank gluing mechanism 1 shown in Fig. 2. The glued blanks are successively transferred by a glued blank transfer conveyer 10 from the blank gluing mechanism, to the blank carriers 30 of the main transportation conveyer 20 as shown in Fig. 2. Can loading mechanism 40, as shown in Fig. 2, then operates to deposit a group of cans C, as shown in Fig. 25, on the inside face of the bottom panel $a$ of the continuously advancing blank.

During continued advance of the can loaded blank as shown in Fig. 25, upfolding devices 80 as indicated in Fig. 1 operate to upfold the blank side panels $b$—$b'$ over the sides of the can group as shown in Fig. 26. The transverse width of the bottom panel *a* is so dimentioned that the lower peripheral edge portions *c* of the grouped cans will project through the adjacent slits at the lower ends of the side panels *b—b'* when upfolded.

The partly assembled package as shown in Fig. 26 continues to advance into contact with top panel infolding devices 90 as indicated in Fig. 1, which initially operate to fold the top panel section *d* inwardly and the handle section *g* thereof upwardly as shown in Fig. 27. During continued advance, the top panel section *d* is folded flatly over the top ends of the packaged cans and the handle section *g* thereof is rebent folded into substantially flat position and in overlying relation to its top panel section *d*, as shown in Fig. 28. The top panel folding devices 90 then operate to fold the opposite top panel section *d'* inwardly and downwardly as shown in Figs. 28 and 29. Pressure devices 100 are provided for applying inward pressure to the side panels *b—b'* adjacent the top score segments *f* thereof, as shown in Fig. 1, to thereby cause the adjacent upper peripheral edge portions *c'* of the packaged cans to project through the upper slits in the side panels *b—b'*. Substantially simultaneously, downward sealing pressure is applied to the composite top panel by down-pressure applying devices 110 as shown in Fig. 1, and this downward pressure is maintained until the overlapped end extensions *i—i'* and overlapped intermediate extensions *j—j'* of the top panel sections *d—d'* have become adhesively bonded together. The completed package is then discharged from the apparatus by a package kick-out device 130 as shown in Fig. 1A. The completed packages as kicked-out from the apparatus are fully assembled, in condition for stacking and shipping. The handle sections *g—g'* can thereafter be raised to vertical position as shown in Fig. 30 for carrying purposes.

The apparatus of this invention is designed to package grouped cans of the same size, whether such cans present bodies of uniform diameter throughout their length, or cans having laterally projecting chimes at the top and bottom ends thereof. If desired, the adhesive patches *s—s'* can be applied to the outside face or the inside face of the end extensions *i* or *i'* and intermediate extension *j* or *j'*, or to either one of the top panel sections *d* and *d'*. Further, adhesive may be applied to the inside face of one of the handle sections *g* or *g'* to bond the same together. The apparatus of this invention is adapted to operate on blanks of various shapes and forms and to enwrap can groups tightly therein. The blank shown in Fig. 24 is therefore intended to be illustrative only of the various types of blanks which may be tightly enwrapped around a group of flat ended cylindrical objects by the use of apparatus constructed in accordance with the teachings of this invention.

*Blank gluing mechanism*

The blank gluing mechanism 1 is only partially illustrated at the left-hand side of Fig. 2 and in general includes a pair of blank conveyer chains 2 each presenting longitudinally spaced and transversely aligned lugs 2' attached thereto and designed to engage the rear edge of successive blanks and advance the same forwardly; the driving sprockets for the conveyer chains 2 being omitted from the drawings. The discharge ends of the conveyer chains 2 are trained around sprockets 3 which idle on the driving shaft 11 of the blank transfer conveyer 10. The upper runs of the blank conveyer chains 2 move through slide channels 4 presenting smooth top surfaces along which the successive blanks may freely slide as driven by the blank advancing lugs 2' of the conveyer chains 2. The successive blanks may be additionally supported by intermediate slide rods 4' and the ends of the advancing blanks are further supported by slide rails 5 extending longitudinally of the apparatus. Each slide rail 5 presents a vertical guide face 5' against which the end edges of the successive blanks are guided and maintained in alignment during advance thereof. The guide faces 5' of the blank slide rails 5 thus cooperate with the blank advancing lugs 2' of the blank conveyer chains 2 to maintain the advancing blanks A in true alignment and assures registry of the end extensions *i* and *j* at one end of the blank with the glue applicator devices. The slide channels 4, slide rod 4' and slide rails 5 of the blank gluing mechanism, may be suitably supported by a framework 140 which includes side frame members 141 and transverse frame members 142 secured to the side frame members 141 and supported on suitable legs.

As shown in Fig. 2, the successive blanks advance under a blank pressure wheel 6 supported on a resiliently pivoted supporting arm. A glue pan 7 is positioned below the blank pressure wheel 6 and glue patches *s—s'* are applied to the adjacent under face of the end extensions *i* and intermediate extension *j* of the advancing blank in proper registered relation thereto. A glue pickup wheel (not shown) has the lower periphery thereof extending into one end of the glue pan 7 and operates to transfer glue to a glue applicator roller (not shown) directly under the blank pressure wheel 6. A glue jug 7' equipped with a suitable feed spout (not shown) supplies the glue to the pan 7. The glue pickup roller and glue applicator roller shafts (not shown) are driven in unison by gearing 8, with power applied to one of the shafts by means of a drive chain 9' trained around the sprocket 9 fixed to the drive shaft 11 of the blank transfer conveyer 10.

*Blank transfer conveyer*

The blank transfer conveyer 10, as shown in Figs. 1, 2, 4 and 5, provides for spacing transition of the successive glued blanks A as discharged by the blank conveyer chains 2 of the blank gluing mechanism 1 and spacing registration of the successive glued blanks in position for pick-up by the successive blank and package carriers 30 of the transportation conveyer 20. The blank transfer conveyer 10 may be supported by a framework 150 which also supports one end of the blank and package transportation conveyer 20, the can loading mechanism 40, and the devices 80 which uphold the side panels of the successive blanks over the sides of the can group as seated on the bottom panel *a* of each successive blank by the can loading mechanism 40.

In general, the framework 150 comprises a pair of sturdy side beams 151 which extend longitudinally of the framework 150 and are suitably supported by a series of paired supporting legs 152, 152', and 152" as shown in Figs. 2 to 6 inclusive. The supporting legs are braced and strengthened by lower side frame members 153 and lower transverse frame members 154.

Figure 3:
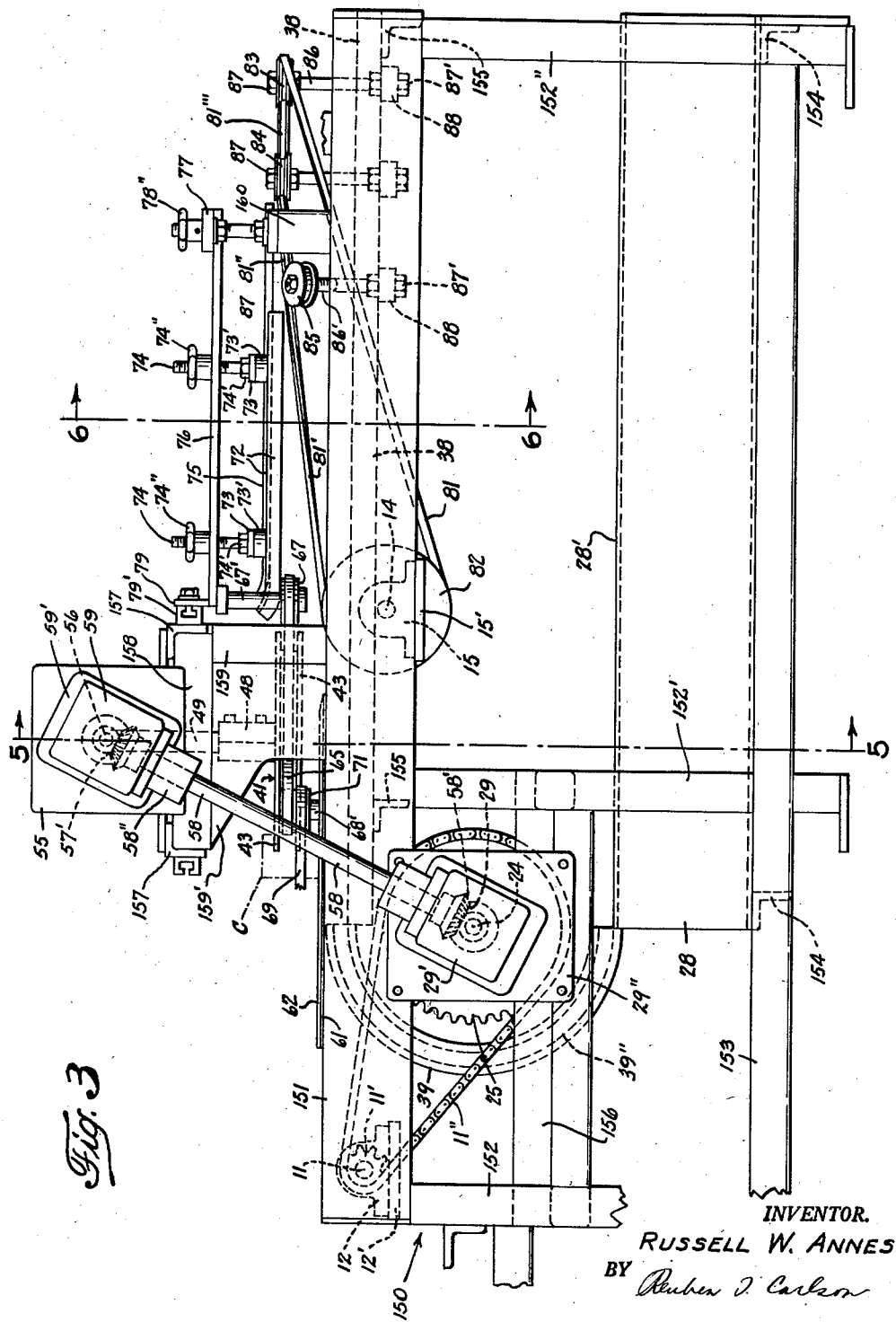
Fig. 3 is a side elevation of that part of the apparatus which is shown in Fig. 2 and illustrates in further detail the driving connections for operating the transfer conveyer, can loading mechanism and blank side panel upfolding devices in timed synchronism.
Figure 4:
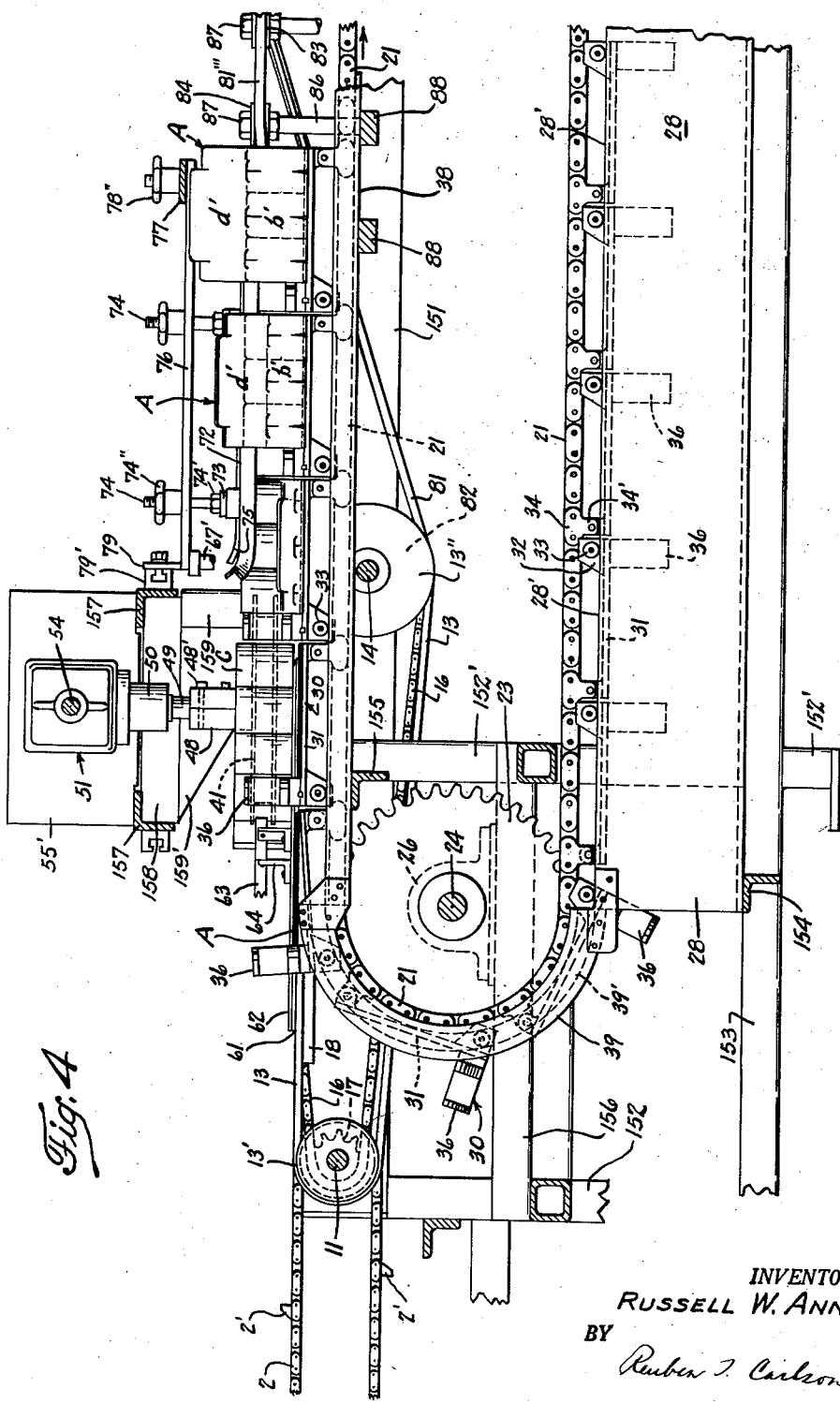
Fig. 4 is a vertical section taken longitudinally of that part of the apparatus which is shown in Fig. 2; this view showing further details of the blank and package transportation conveyer, the can loading mechanism, the blank loaded can aligning devices, and the blank side panel upfolding devices.
Figure 5:
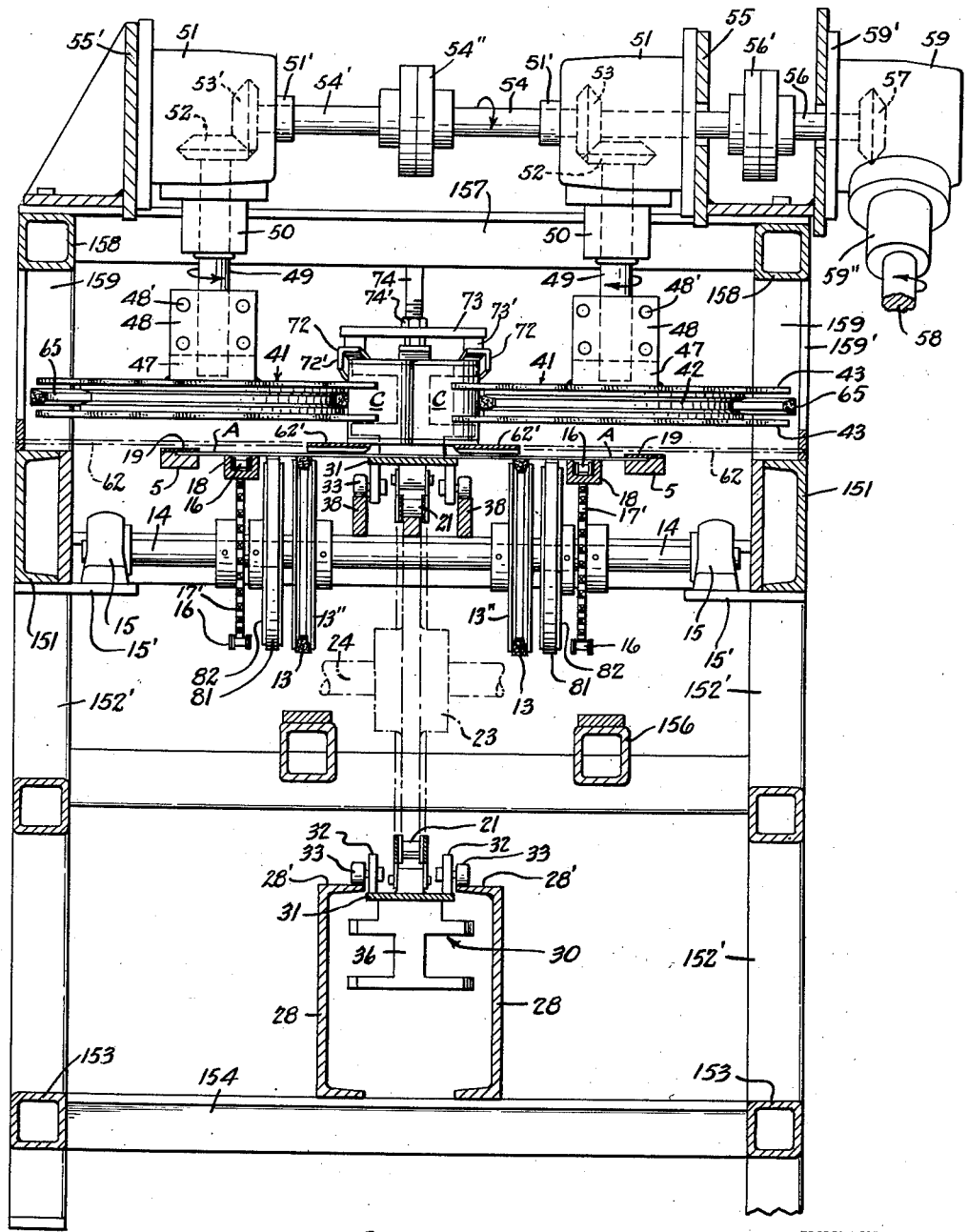
Fig. 5 is a vertical section taken transversely of the apparatus as the same would appear when viewed in the direction of the arrows 5—5 of Fig. 3.

The drive shaft 11 of the blank transfer conveyer 10 is rotatably supported in bearing blocks 12 fixed to bracket plates 12' secured to the under side of the side beams 151 adjacent the head end of the framework 150 as shown in Figs. 2 and 3. A pair of blank transfer belts 13 are trained around drive sheaves 13' fixed to the driving shaft 11 as shown in Fig. 2. The transfer belts 13 are supported at the other end thereof by drive sheaves 13" fixed to a driven shaft 14 which is positioned under the can loading mechanism 40 and rotatably supported by bearing blocks 15 supported by bracket plates 15' secured to the underside of the side beams 151 as shown in Fig. 5. The drive sheaves 13' which support the transfer belts 13 are positioned between the idler sprockets 3 which support the discharge end of the blank conveyer chains 2 of the blank gluing mechanism 1, as shown in Fig. 2, and are substantially the same diameter as the diameter of the idler sprockets 3, as is evident by referring to Figs. 2 and 4. The transfer belts 13 are designed to support the intermediate portions of the glued blanks A as successively transferred thereto by the blank conveyer chains 2.

The glued blanks A transferred to the transfer belts 13 are positively advanced by a series of longitudinally spaced blank engaging lugs 16' secured to a pair of transfer chains 16. The blank engaging lugs 16' are arranged on the transfer chains 16 in paired alignment and are designed to engage the rear edge of the successive glued blanks as transferred to the transfer belts 13, and thus positively advance the successive glued blanks in properly spaced relation so that they may be picked up by the successive carriers 30 of the blank and package transportation conveyer 20. The transfer chains 16 are trained around a pair of driven sprockets 17 fixed to the shaft 11 of the blank transfer conveyer 10 and are positioned exterior to the sprockets 3 of the blank conveyer chains 2 of the blank gluing mechanism 1 as shown in Fig. 2. The sprockets 17 are somewhat smaller in diameter than the transfer belt supporting sheaves 13'; the other end of the transfer chains 16 are trained around companion sprockets 17' fixed to shaft 14 positioned under the can loading mechanism 40, as shown in Fig. 5.

The upper runs of the transfer chains 16 travel within a pair of slide channels 18 presenting smooth top surfaces on which the outer portions of the glued blanks are slidably supported as shown in Figs. 2 and 5. The transversely paired blank advancing lugs 16' project above the slide surfaces of the slide channels 18 a sufficient extent to engage the rear edges of the successive glued blanks and thereby slide the same on the slide surfaces of the slide channels 18 when the glued blank is fully deposited on the transfer belts 13. The slide channels 18 are suitably supported by one or more transverse frame members 155 whose ends are secured to the side beams 151 and form a part of the framework 150.

The outer ends of the glued blanks A are supported by continuations of the paired slide rails 5 of the blank gluing mechanism and the ends thereof are guided by continuations of the vertical guide faces 5' which cooperate with the blank advancing lugs 16' to maintain the glued blanks in true alignment during advance movement thereof on the transfer belts 13, as shown in Figs. 2 and 5. A lip rod or plate 19 is secured to each of the slide rails 5 and extends inwardly in overhanging relation to the vertical guide face 5' thereof. The lip plates 19 overhang the end edges of the advancing blanks, as shown in Figs. 2 and 5, to thereby prevent upcurling of the glued blank ends during travel thereof on the transfer belts 13, slide channels 18, and slide rails 5. The slide rail extensions 5 may also be suitably supported by the transverse frame members 155 forming a part of the framework 150 of the apparatus.

The upper runs of the transfer belts 13, as driven by the sheaves 13' fixed to the driven shaft 11, advance at a slower speed than the glued blank advancing chains 2 of the glue mechanism 1, whose supporting sprockets 3 idle on the shaft 11. As the rear edge of the glued blank is driven over the idler sprockets 3 by the paired lugs 2' of the conveyer chains 2, the advance edge of the blank will rest on and be pushed along the upper runs of the slower speed transfer belts 13. When the glued blank has been fully pushed onto the upper runs of the transfer belts 13, the paired follower lugs 16' of the transfer chains 16 will engage the rear edge of the glued blank and positively advance the blank.

As a result of this transfer operation, the ultimate longitudinal spacing between the rear edge of a preceding blank and the front edge of a following blank as advanced by the blank transfer conveyer 10, becomes less than the corresponding longitudinal spacing of the blanks advanced by the chains 2 of the blank gluing mechanism 1 as shown in Fig. 1. The precise longitudinal spacing of the blanks is determined by the advance speed of the transfer chains 16 and the longitudinal spacing of the transversely aligned lugs 16' as fixed thereto. Proper adjusted spacing of the glued blanks A on the blank transfer conveyer 10 is important in assuring registering deposition of the successive blanks on the carriers 30 of the blank and package transportation conveyer 20.

The glued blank transfer conveyer 10 is positively driven by a sprocket 11' fixed to one end of the transfer conveyer shaft 11 as shown in Figs. 2 and 3. A drive chain 11" trained around the sprocket 11' is driven from a larger sprocket 25 fixed to the head shaft 24 of the blank and package transportation conveyer 20, which will now be described.

*Blank and package transportation conveyer*

The blank and package transportation conveyer 20 comprises a continuous transportation chain 21 which supports a plurality of successive blank and package carriers 30. The transportation chain 21 is trained around a head sprocket 23 fixed to a head shaft 24 and a tail sprocket 23' fixed to a tail shaft 24', as indicated in Figs. 1, 1A, 4, 5 and 21. The head shaft 24 rotates in a pair of head bearing blocks 26 supported by intermediate side struts 156 forming a part of the framework 150 and the tail shaft 24' is similarly rotatably supported in a pair of bearing blocks 26' which are secured to side struts 169 at the discharge end of the apparatus as shown in Fig. 21. Either the head shaft 24 or the tail shaft 24' may be connected to a main driving motor or a power transmission shaft 180. The head shaft 24 provides the driving means for the blank transfer conveyer 10, the transportation conveyer 20, and the can loading mechanism 40.

The transportation chain 21 is assembled from a paired series of overlapping link plates 21' which are connected by hinge pins 22, the paired link plates 21' being spaced by spacing rollers 22' journalled on the hinge pins 22 as shown in Figs. 8 to 11 inclusive. A strong chain construction is thus provided. The upper run of the transportation chain 21 intermediate the head and discharge sprockets 23—23' is supported by a longitudinally extending track rail 27 which is fixed to the series of upper transversely extending frame members 155 secured to the side beams 151 of the framework 150 as shown in Figs. 4, 5 and 6. The lower run of the transportation chain 21 is indirectly supported by a pair of guide channels 28 whose upper flange portions 28' extend inwardly as shown in Fig. 5. The guide channels 28 are supported by the lower transverse frame members 154 secured to the lower side frame members 153 of the framework 150 as shown in Figs. 3, 4 and 5.

The blank and package carriers 30 are designed to receive the successive glued blanks A as the carriers 30 move upwardly around the head sprocket 23 of the transportation conveyor 20 as indicated in Fig. 4. Each blank and package carrier 30 comprises a platform plate 31 as shown in Figs. 8 to 12. Each platform plate 31 presents a flat upper face and has a length designed to support the can group as shown in Fig. 12, and in addition thereto, supports a follower tree 36 fixed to the rear end thereof. The width of each platform plate 31 is somewhat less than the can group to be supported thereon as shown in Figs. 5 and 12. The platform plates 31 are so mounted that, during horizontal travel thereof, their ends are in closely adjacent relation and preferably separated approximately only one-sixteenth to one-fourth of an inch as indicated in Fig. 8.

Each platform plate 31 presents a pair of supporting lugs 32 projecting from its underface and adjacent the following end thereof as shown in Figs. 8, 9, 10 and 11. A carrier roller 33 is rotatably mounted on a stub pintle 33' secured to each supporting lug 32. The following end of each platform plate 31 is not fixed to the transportation chain 21, but the advance end thereof is pivotally mounted on the transportation chain 21 by means of a pair of lug links 34 forming a part of the transportation chain and which present a pair of projecting lug sections 34'. A bearing boss 35 projects from the underface of each platform plate 31 adjacent the advance end thereof and is hingedly connected to the paired lug sections 34' of the lug links 34 as by a hinge pintle 35'.

The follower tree 36 is secured to the top face of each platform plate 31 adjacent the rear end thereof by a securing bolt 36" as shown in Figs. 8 and 10. Each follower tree 36 presents a trunk section 36' which is substantially narrower than the width of the platform plate 31 to which it is secured. Each follower tree 36 also presents a pair of spaced limb sections 37 extending laterally from each side thereof and whose ends project beyond the adjacent side edges of the platform plate 31. Each pair of limb sections 37 define an open gap 37' therebetween and through which a peripheral portion of a turret wheel 41 of the can loading mechanism 40 may rotate during continuous travel of the upper run of the transportation chain 21 and the carriers 30 mounted thereon.

The paired supporting rollers 33 of each carrier 30 are designed to roll along a pair of spaced longitudinally extending rail tracks 38 during advance travel of the upper run of the transportation chain 21 as shown in Figs. 3, 4, 5, 6 and 7. The rail tracks 38 are supported by the upper transversely extending frame members 155 of the framework 150. During the lower return run of the transportation chain 21, the carrier rollers 33 roll in contact with the upper inturned flanges 28' of the lower guide channels 28 as shown in Fig. 5. As is obvious, the blank and package carriers 30 are in inverted position during the lower run of the transportation chain 21. The inverted carriers 30 are supported in inverted position by the carrier rollers 33 in rolling contact with the upper flanges 28' of the guide channels 28, and with the follower trees 36 of the inverted carriers 30 travelling in downwardly suspended position between the guide channels 28 by which they are protected.

The blank and package carriers 30 are guided around the head sprocket 23 by a pair of spaced arcuate track sections 39 and are guided around the tail sprocket 23' by a similar pair of spaced arcuate track sections 39' as shown in Figs. 3, 4 and 21. Each of the paired arcuate track sections 39—39' present paired roller receiving grooves 39" which receive the carrier rollers 33 and thus guide the following end of each carrier to and from horizontal position during movement of the transportation chain 21, to which the advance end of the carriers is pivotedly secured.

The upper run of the transportation conveyor 20 travels at a higher speed than the upper run of the transfer chains 16 of the blank transfer conveyor 10. The glued blank advancing lugs 16' of the transfer chains 16 maintain the adjacent blanks in uniformly spaced relation, with the rear edge of the preceding blank in parallel relation to the lead edge of the following blank, and the successive blanks are thereby positively advanced into a position over the head sprocket 23 of the blank and package transfer conveyor 20 as shown in Figs. 1, 2 and 4.

As the transportation carriers 30 travel upwardly around the main sprocket 23, the follower trees 36 thereof become spread apart as shown in Fig. 4, and are progressively swung upwardly between the uniformly spaced rear and front edges of adjacent blanks, with the result that each successive blank bottom panel a is picked up by the upper surface of the carrier platform plate 31 as it rises along the upper quadrant of the head sprocket 23. The upper runs of the glued blank advancing chains 16 advance the blanks at a speed which is synchronized with the advance speed of the chain supported transportation carriers 30 so as to assure registered deposition of successive blank bottom panels a on to the successive platform plates 31.

The blank advancing chains 16 and blank supporting transfer belts 13 of the blank transfer conveyor 10 and the chain 21 of the blank and package transportation conveyer 20 are driven in synchronism from the head shaft 24 of the transportation conveyor 20. The sprocket 11' fixed to one end of the blank transfer conveyor shaft 11 carries the driving chain 11" which is trained around the sprocket 25 fixed to the adjacent end of the head shaft 24 of the transportation conveyer 20 shown in Figs. 2 and 3. The head shaft 24 may be positively driven by a driving motor or other driving means such as a power transmission shaft 180 extending longitudinally of the apparatus and partially shown in Fig. 7.

*Can loading mechanism*

The can loading mechanism 40, as shown in Figs. 1, 2, 3, and 4, may comprise a single turret wheel 41 which would be used only when one row of cans are to be loaded on the advancing blanks, or two turret wheels 41 which would be used when two rows of cans are to be loaded on the advancing blanks. For purposes of illustration, the can loading mechanism shown in the drawings embraces two similar turret wheels 41 operative to load a can group comprising two rows of cans of three cans in each row.

Each can loading turret wheel 41 comprises a wheel sheave 42 which is sandwiched between a pair of larger diameter star discs 43 of matched size and contour. The paired star discs 43 present generally arcuate or semicircular can receiving pockets. Each of the two turret wheels 41 shown in Fig. 2 present a series of fifteen can-receiving pockets, or five sets of can receiving pockets with each set presenting three pockets.

One set of three can pockets is separated from the adjacent set of three can pockets by a primary star point 44, and the three can pockets of each set are respectively separated by a secondary star point 45 and a tertiary star point 46. Each primary star point 45 is of greater radial length and of greater peripheral width at the terminal end thereof than the secondary and tertiary star points 45 and 46 as shown in Fig. 2. Each primary star point 44 defines with the next adjacent secondary star point 45 a lead can-receiving pocket 44' of generally semi-circular shape. Each secondary star point 45 and the adjacent tertiary star point 46 are similar in form and equal in radial length, and define therebetween an intermediate can-receiving pocket 45' of semicircular shape. The trailing edge 44" of each primary star point 44 flares rearwardly and defines with the preceding tertiary star point 46 a tail can-receiving pocket 46' having a broadened arcuate contour so that the third can of the preceding can set is spaced from the lead can of the following can set a distance which conforms to the thickness of the follower tree 36, as shown in Fig. 2. However, since the secondary and tertiary star points 45 and 46 are of reduced radial length, the three cans of each set are in substantial body contact, thereby assuring body contact nesting of the three cans of each row when deposited on the bottom panel a of the adjacent advancing blank.

The two turret wheels 41 are rotated in opposite directions so as to advance the two rows of cans therebetween at the same speed of travel as the upper run of the carrier supporting transportation chain 21 advancing therebetween. The two can loading turret wheels 41 are so related and transversely spaced that opposite cans of the twin can rows are positioned on the bottom panel a of the advancing blank in transverse alignment and substantially in body contact. The wider and longer primary star points 44 insure separation of the trailing or third can of the preceding can set from the lead or first can of the following can set to a sufficient degree to permit the follower tree 36 to wedge therebetween during continuous travel of the carriers 30 between the turrets 41. Snug grouping of the can sets on the blank bottom panels a as supported on the carrier platform plates 31 is thus assured.

The turret wheels 41 are rotatably suspended on opposite sides of the transportation conveyer 20. Each turret wheel 41 presents an upwardly projecting hub section 47 which receives the lower end of a vertically extending shaft 49 and is detachably secured thereto by a pair of clamp blocks 48 and clamp bolts 48' as shown in Figs. 2, 3, 4 and 5. Each shaft 49 and its turret wheel 41 is suspended from a bearing journal 50 secured to an overhead gear housing 51 which contains a beveled gear 52 secured to the upper end of the shaft 49. One of the beveled gears 52 is driven by a companion beveled gear 53 fixed to the midportion of a shaft section 54 while the other beveled gear 52 is driven by a companion beveled 53' fixed to the end of a companion shaft section 54'; the adjacent aligned ends of the shaft sections 54—54' being detachably connected by a connecting coupling 54". The shaft sections 54—54' are rotatably mounted in bearing journals 51' supported by the gear housings 51.

One of the gear housings 51 is secured to and supported by an angular bracket 55' and the other gear housing 51 is secured to and supported by the adjacent vertical wall of a U-shaped bracket 55 as shown in Fig. 5. The angular bracket 55' and U-shaped bracket 55 are secured to and supported by a pair of overhead frame members 157 which extend transversely of the framework 150 and between which the downwardly extending bearing journals 50 project. The transverse frame members 157 are supported by a pair of overhead side frame sections 158 each of which are supported by a vertical leg section 159 and a bracing plate 159' fixed to the adjacent side beam 151 of the framework 150 as shown in Figs. 2, 3, 4, and 5.

To permit convenient assembly and disassembly of the can loading turret wheels 41, the outer end of the shaft section 54 may be detachably secured to the adjacent end of a power shaft section 56 as by connecting coupling 56' contained within the U-shaped bracket 55 as shown in Fig. 5. The shaft sections 54 and 56 extend through aligned holes in the side walls of the U-shaped bracket 55 as shown in Fig. 5. The projecting outer end of the power shaft section 56 has a beveled gear 57 secured thereto which meshes with a companion beveled gear 57' secured to the upper end of an upwardly inclined drive shaft 58 as shown in Figs. 2, 3, and 5.

The intermeshing beveled gears 57 and 57' are contained within a gear box 59 having a securing flange 59' which is fixed to the outer side wall of the adjacent U-bracket 55, as shown in Fig. 5. The upper gear box 59 is also provided with a bearing journal 59" in which the upper end of the drive shaft 58 is journaled. The lower end of the drive shaft 58 has a beveled gear 58' secured thereto which meshes with a companion beveled gear 29, secured to the adjacent projecting end of the head shaft 24 to which the head sprocket 23 of the transportation chain 21 is also fixed. The intermeshing beveled gears 58' and 29 are contained within the gear box 29' to which the lower bearing journal 58" of the drive shaft 58 is secured. The gear box 29' has a flange plate 29" by which it is secured to the adjacent outside face of the side beam 151 and the intermediate side strut 156 of the framework 150 as shown in Fig. 3.

Rotation of the head shaft 24 drives the carrier supporting transportation chain 21, the blank transfer chains 16, and also rotates the two can loading turret wheels 41 in synchronized unison. The driving ratio of the driving devices is such as to rotate the can advancing peripheries of the can loading turret wheels 41 at the same peripheral speed as the speed of advance of the upper run of the transportation chain 21 which supports the blank and package carriers 30.

A row of cans is supplied to each of the can loading turret wheels 41 from a driven can supply conveyer 60 positioned on each side of the apparatus as shown in Figs. 1 and 2. Each can feed conveyer 60 may be of any desired construction but normally comprises a conveyer belt 60' formed by hingedly connected plates which are trained over a belt supporting roller 60". The single row of cans discharged from each conveyer belt 60' is pushed onto an adjacent supplemental floor plate 61 as shown in Fig. 3 which is secured to the adjacent side beam 151 of the framework 150 and whose upper face is substantially co-planar with the can supporting surface of the conveyer belt 60'.

The cans are driven diagonally across the supplemental floor plate 61 onto a main floor plate 62 which is secured to the adjacent beam 151 of the framework 150. The main floor plate 62 presents an arcuate rim portion 62' extending under the can advancing periphery of the adjacent can loading turret wheel 41 as shown in Figs. 3, 4, and 5. The upper face of each main floor plate 62 and its rim portion 62' is co-planar with the upper face of the adjacent supplemental floor plate 61 so that the single row of cans is smoothly pushed across the flat horizontal surfaces thereof and supported thereby until loaded by the turret wheel 41 onto the advancing packaging platforms 31.

The cans as discharged from each can feed conveyer 60 are guided in their movement across the supplemental floor plate 61 and main floor plate 62 by an outer can guide rail 63, as shown in Fig. 2. Each guide rail 63 is suitably supported as by a series of foot brackets 64 secured to the supplemental and main floor plates 61 and 62 as shown in Figs. 2 and 4. Each can guiding rail 63 presents a relatively straight and only slightly curvilinear can entry section 63' and a reversely curved arcuate section 63" which is so formed as to gently push the advancing cans into the adjacent can receiving pockets of the can loading turret wheel 41 as shown in Fig. 2. When the successive cans have been pushed beyond the inner terminal end of the can guiding rail 63, they will be advanced by the successive star points 44, 45, and 46 of the can loading turret wheel 41 into a position where they can be pushed laterally from the turret wheel pockets and onto the adjacent advancing blank bottom panel a supported on the packaging carrier 30.

It will be noted by referring to Figs. 2 and 5 that the flat blanks A supported on the platform plates 31 of the packaging carriers 30 advance directly under the main floor plate 62, and that the inner side edge 62" of each floor plate 62 is directly adjacent and parallel to, but slightly above the line of travel of, the adjacent side edge of the platform plate 31. As a result, each can may be progressively pushed off from the outer side edge 62" of the floor plate 62 during rotation of the adjacent can advancing turret wheel 41. As each can is pushed off the inner side edge 62" of the floor plate 62, it executes a slight inward tilting movement until its bottom end is fully seated on the bottom panel a of the adjacent advancing blank. This tilting placement of the cans on the blank bottom panel a contributes to the snug grouping of the cans on the blank bottom panel.

The cans which constitute a single can row are progressively driven from the pockets 44', 45' and 46' of the can advancing turret wheel 41, positively pushed off the inner side edge 62" of the floor plate 62, and into seated position on the advancing blank bottom panel a by a can stripping or kick-out belt 65 which extends around approximately ¼ the circumference of the turret sheave 42, as shown in Fig. 2, and is driven thereby. The can kick-out belt 65 is also trained around three spacer sheaves 66, 67, and 68 arranged in the manner shown in Fig. 2 and respectively supported by vertical pintles 66', 67' and 68'. The pintles 66' and 67' which rotatably support the spacer sheaves 66 and 67 are each suspended from a male key member 79 which is transversely slidable in a female key member 79' fixed to the adjacent overhead frame member 157 as shown in Fig. 3. The pintles 66' and 67' are thus transversely adjustable to effectuate tensioning of the kick-out belt 65. The pintle 68' which rotatably supports the guide sleeve 68 may be fixed to the adjacent side beam 151 of the framework 150. The can kick-out belt 65 presents an inner run 65' which extends parallel and adjacent to the path travel of the adjacent side edge of the platform plate 31 of the transportation carrier 30. As the longitudinal run 65' of the kick-out belt 65 leaves the turret wheel sheave 42 by which it is driven, the longitudinal run 65' drives the successive cans radially out of the adjacent pockets of the can loading turret wheel 41 and pushes them laterally off from the inner side edge 62" of the platform plate 62 and onto the adjacent blank bottom panel a advancing between the adjacent longitudinal sections 65' of the paired can kick-out belts 65.

The can kick-out belt 65 also presents a can entry run 65", as shown in Fig. 2, which extends substantially parallel to the adjacent section 63" of the outer can guide rail 63 and which travels transversely towards the transportation conveyor 20. The entry run 65" contacts the adjacent can bodies and rolls them along the adjacent section 63" of the guide rail 63 until they are seated in the adjacent pockets of the can advancing turret wheel 41.

Means are also provided for driving the cans discharged by the can conveyor 60 into engagement with the can entry run 65" of the can kick-out belt 65. This driving means, as shown in Fig. 2, comprises a can entry advancing belt 69 trained around a pair of sheaves 70 and 71. The sheave 70 is rotatably supported on a pintle 70' fixed to the supplemental floor plate 61, and the other sheave 71 may be fixed to the kick-out belt spacer sheave 68. The belt supporting sheaves 70 and 71 are so positioned that the can advancing belt presents the inner run 69' thereof in a position to roll the cans against the entry section 63' of the outer can guide rail 63 and thence into engagement with the adjacent entry run 65" of the can kick-out belt 65 which continues to roll the cans against the can guide rail 63 until the cans are seated in the pockets of the adjacent turret wheel.

The cans are positively driven in body contact by the inner run 69' of the entry belt 69 and the entry run 65" of the kick-out belt 65 from the discharge end of the can conveyer 60 until seated in the pockets of the can loading turret wheel 41. The can entry advancing belt 69 is driven by its sheave 71 mounted on the shaft pintle 68' and fixed to sheave 68 and is thus rotated by the driven kick-out belt 65. The kick-out belt 65 is in turn driven by the wheel sheave 42 of the positively driven can loading turret wheel 41. The supporting sheave 71 which drives the can advancing entry belt 69 is of such diameter as to insure advance movement of the inner run 69' of the can advancing belt 69 at a speed which will assure body contact of the cans travelling between the inner run 69' of the belt 69 and the adjacent can guide rail 63. Body contact of the advancing cans is additionally assured by running the can conveyer 60 at a linear speed somewhat greater than the linear travel speed of the inner run 69' of the can entry advancing belt 69. Positive loading of consecutive cans on the bottom panel a of the successively advancing blanks is thereby assured.

When the can group has been seated on the blank bottom panel a, as shown in Fig. 2, the adjacent cans of each can row are initially maintained substantially in body contact by the follower trees 36 between which the can groups are positioned. The cans of each row are also adjusted into substantially longitudinal alignment with the opposite cans of each row in substantially body contact, by the parallel inner runs 65' of the can kick-out belts 65.

To further insure that the cans of each row are maintained in positive longitudinal alignment before and during upfolding of the blank side panels b—b' over the sides of the can group, a pair of angular shaped can aligning side rails 72 are provided which present a pair of downwardly extending can aligning side flanges 72' between which the carrier supported can group advances as soon as the can group has been seated on the blank bottom panel a by the longitudinal runs 65' of the can kick-out belts 65, as shown in Figs. 3, 4, 5 and 6. The forward ends of the can aligning side rails 72 are preferably flared upwardly and outwardly as shown in Fig. 4 to insure unobstructed entry of the advancing can group therebetween.

The can aligning side rails 72 are supported by a series of transverse bar sections 73 as shown in Figs. 4, 5 and 6 which are secured to the paired side rails 72 as by connecting necks 73'. A suspension rod 74 extends through the mid portion of each bar section 73 and is adjustably secured thereto as by a pair of lock nuts 74'. Additional means are also provided to insure that the bottom ends of the can group remain properly seated on the blank bottom panel a. An intermediate bar 75 extends longitudinally between the paired can aligning side bars 72. The intermediate pressure bar 75 is suitably secured to the lower ends of the suspension rods 74 as shown in Fig. 6 with the underface of the pressure bar 75 directly above, but closely adjacent to, the twin can rows.

Each suspension rod 74 extends through a conforming hole in an overhead support bar 76 which extends longitudinally of the apparatus. The upper threaded end of each suspension rod 74 is provided with a hand knob 74' which has bearing contact with the upper face of the overhead support bar 76. By suitable adjustment of the handle knobs 74", the can aligning side rails 72 and the intermediate pressure bar 75 may be adjustably elevated in conformity with the height of the cans being packaged and maintained in the desired adjusted position by a lock nut 74'.

The rear end of the overhead support bar 76 is suitably secured to a transverse overhead bar 77 as shown in Figs. 3 and 6. Each end of the transverse support bar is adjustably supported by a riser rod 78 fixed to a post section 160 supported by the adjacent side beam 151. Each riser rod 78 extends through a conforming hole in the end of the transverse support bar 77 which rests on a support nut 78' threaded on the riser rod 78 and whereby the transverse overhead bar 77 may be adjustably elevated as desired. A hand knob 78" which is threaded to the upper end of each riser rod 78, may be adjusted to clamp the end of the overhead bar 77 against the elevating nut 78'. The front end of the longitudinal overhead support bar 76 may be secured as by a bracket lug to the female key member 79' fixed to the adjacent transverse frame member 157.

The can aligning side rails 72 and the longitudinal pressure bar 75 make certain that the can rows of the successively advancing can groups are in true longitudinal alignment and properly centered on the blank bottom panels a as advanced by the packaging carriers 30 before the blank side panels b—b' are upfolded. The inturned flanges of the aligning rails 72 and the intermediate pressure bar 75 also prevent the cans in the can groups from jumping away from their properly seated position on the blank bottom panel, and also cooperate to positively prevent the cans of the can groups from tipping or falling from their properly nested position. Additionally, the successive follower trees 36, as shown in Figs. 2 and 4, positively prevent longitudinal shifting of the cans in the can groups during forward advance thereof.

*Side panel upfolding devices*

Side panel upfolding devices 80, positioned on opposite sides of the transportation conveyor 20 and adjacent the can aligning rails 72, operate to progressively upfold the side panels b—b' of the can loaded blanks over the sides of the can groups as shown in Figs. 2, 3, 5, 6 and 7. The upfolding devices comprise a pair of side panel upfolding belts 81 made of strong and wear resisting but flexible material of generally V-shaped cross section. Each belt 81 is driven from a sheave 82 fixed to the driven shaft 14. As previously explained, the driven shaft 14 also supports the transfer belt sheaves 13" and the chain sprockets 17' of the blank transfer mechanism 10 as shown in Figs. 3, 4 and 5.

The other end of each upfolding belt 81 is supported by a horizontal sheave 83 which is positioned beyond the discharge ends of the can aligning rails 72. The inner run of each side panel upfolding belt 81 is also supported and guided by a horizontal sheave 84 and by an inclined sheave 85. Thus the inner run of each side panel upfolding belt 81 presents an initial upwardly inclined inner run 81' as it passes between the drive sheave 82 and the incline sheave 85, a secondary upwardly inclined inner run 81'' as it passes between the incline sheave 85 and the first horizontal guide sheave 84, and a short horizontal inner run 81''' as it passes between the horizontal guide sheave 84 and the horizontal supporting sheave 83.

Each of the guide sheaves 83 and 84 are supported at the upper end of a vertically extending tubular post 86. Each incline sheave 85 is supported by a tubular post 86' whose upper end is inclined outwardly as indicated in Figs. 2, 3 and 6. Each sheave 83, 84 and 85 is rotatably journalled on a bearing bolt 87 threaded into the upper end of its tubular post 86—86'. The lower end of each tubular post 86—86' is secured as by an adjustable securing bolt 87' to the adjacent end of a cross bar 88. Guide sheave supporting cross bars 88 are suitably secured in spaced relation to the under face of the paired rail tracks 38 whose upper faces provide the trackways for the carrier supporting rollers 33.

The initial inclined runs 81' of the upfolding belts 81 operate to swing the side panels *b—b'* of the can loaded blank upwardly as soon as the blank ends have been discharged from the ends of the side rails 5 and lip plates 19 of the blank transfer conveyor 10 as shown in Fig. 2. The blank side panels *b—b'* continue to be progressively upfolded by the secondary inner runs 81'' on the upfolding belts 81 until they have been upfolded into substantially vertical position as they pass the guide sheaves 84, and the blank side panels *b—b'* become fully upfolded as they pass the guide sheaves 83, as is evident by referring to Figs. 2 and 4. Since the blank bottom panel *a* is of slightly less transverse width than the width of the can group positioned thereon, the adjacent lower rim portions *c* of the cans will project through the adjacent slits formed in the lower ends of the blank side panels *b—b'* when the side panels are upfolded, as shown in Figs. 6 and 15.

Thus, when the partly assembled packages pass the final pair of upfolding belt sheaves 83, the blank side panels *b—b'* are fully upfolded with the bottom ends of the packaged cans locked in seated position on the blank bottom panel *a*, and with the adjacent lower rim portions *c* thereof projecting into the adjacent slits presented by the bottom ends of the blank side panels *b—b'*. The guide sheaves 83, 84 and 85 are so mounted and positioned as to effectuate smooth and gradual upfolding of the blank side panels *b—b'* as shown in Figs. 2, 3, 4 and 6. The top panel sections *d—d'* are then in a position to be infolded and secured together during continued advance of the partly formed can package.

*Top panel infolding devices*

As shown in Figs. 1, 7, 13 and 14, top panel infolding devices 90 are provided which operate to initially infold the blank top panel section *d* over the top ends of the adjacent packaged cans as shown in Figs. 16, 17, and 18, upfold and rebend the handle section *g* associated with the first infolded top panel section *d* as shown in Figs. 17, 18 and 19, and to thereupon infold the companion top panel section *d'* into adhesively secured relation with the adhesive patches *s—s'* previously applied by the gluing mechanism 1 to the end extensions *i* and intermediate extension *j* of the top panel section *d* as shown in Figs. 18, 19 and 20.

The infolding devices 90 comprise a first infolding rod 91 having an outwardly flared entry end 91' against which the vertical top panel section *d* initially engages. During continued advance travel of the partly formed package, the blank top panel *d* moves into contact with a longitudinally extended section 91'' of the infolding rod 91, which overhangs the top ends of the adjacent can row, to thereby infold the blank top panel section *d* to the positions indicated in Figs. 13, 14, 16 and 17. The initial infolding straight section 91'' of the rod 91 merges into a dropped hip section 92 from which a secondary straight section 92' extends and which is positioned relatively close to the upper ends of the adjacent advancing cans, as shown in Figs. 14, 17 and 18. The secondary straight section 92' operates to infold the blank top panel section *d* into substantially horizontal position as shown in Fig. 18.

A fork rod 93, having an angular hip section 93' which is secured to the rod 91, presents a straight rod section 93'' which is positioned adjacent the top ends of the adjacent advancing can row and inwardly of the secondary straight section 92' of the rod 91. The straight section 93'' of the fork rod 93 insures substantially complete infolding of the blank top panel section *d* into horizontal position over the upper ends of the adjacent can row as indicated in Fig. 18. It will be noted that the terminal end of the straight section 93'' of fork rod 93 extends forwardly beyond the terminal end of the straight section 92' of the initial infolding rod 91 and thus maintains the blank top panel section *d* in horizontal infolding position until otherwise held by additional folding rods as described below.

A third rod 94, mounted medially of the transportation conveyer and above the traveling package, is positioned to upfold and rebend fold the handle section *g* of the blank top panel section *d* as indicated in Figs. 13, 14, 17, 18 and 19. The handle upfolding and rebend folding rod 94 presents a straight section 94' extending longitudinally of the can group travel and is so positioned that the handle section *g* of the blank top panel section *d* will strike the straight section 94' of the rod 94 during progressive infolding of the blank top panel section *d* as executed by the straight section 91'' of the first infolding rod 91, as is evident by referring to Figs. 13, 14 and 17. The straight section 94' of the rod 94 merges into a dropping hip section 95 from which a handle rebending section 95' extends in a diagonal direction to thereby rebend the handle section *g* over its top panel section *d* while held in horizontal position by the straight section 93'' of the fork rod 93, as indicated in Figs. 18 and 19.

When the first top panel section *d* had been substantially infolded as shown in Figs. 17 and 18, the advancing package moves into contact with a fourth infolding rod 96 which operates to infold the companion top panel section *d'*. The companion top panel infolding rod 96 presents a substantially straight section 96' which extends diagonally inwardly and downwardly across the path of travel of the adjacent can row, as shown in Figs. 13 and 14, and which operates to partially infold the adjacent top panel section *d'* as indicated in Figs. 17, 18 and 19. The diagonally inclined section 96' of the rod 96 merges into a dropping hip section 97 from which a secondary diagonal section 97' extends, as shown in Figs. 13 and 14, and which operates to further infold the adjacent top panel section *d'* into substantially horizontal position. The secondary section 97' terminates in a longitudinal extending toe section 97'' which presses the handle section *g'* of the top panel section *d'* into contact with the rebent handle section *g* of the previously infolded top panel section *d* as shown in Fig. 20.

The first top panel infolding rod 91 and the forked rod 93 attached thereto, the handle upfolding and rebend folding rod 94, and the second panel infolding rod 96, are adjustably suspended in proper spaced relation to the top of the traveling package by means of a series of suspension stems 98 which are respectively welded thereto as shown in Figs. 7, 13, 14 and 15. The suspension stems 98 extend through adjusting slots 98' provided in an overhead support bar 99 which extends transversely of the apparatus as shown in Fig. 7. The threaded upper end of each suspension stem 98 is provided with a pair of locked nuts 98" by means of which the stem and its suspended folding rod is adjustably secured to the adjacent overhead bar 99. Thus, the respective top panel folding rods 91 and 93, 94 and 96 can be both laterally and vertically adjusted to accurately perform their assigned top panel folding operations in a precise manner, irrespective of the height or diameter of the grouped cans being packaged.

The overhead support bar 99 is also adjustably supported by riser rods 99' as shown in Fig. 7. The upper threaded end of each riser rod extends through the adjacent end of the overhead support bar 99 and is adjustably secured thereto by a hand knob 99". Each riser post 99' may be similar in construction to the riser rods 78 and may be supported on post sections which are similar to the post sections 160 which support the transverse bar 77 from which the can aligning rails 72 are suspended as previously described.

It will be appreciated that the first top panel infolding rod 90 and its associated fork rod 93, the handle folding rod 94, and the second panel infolding rod 96, are so shaped and formed as to progressively execute the top panel and handle section folding operations illustrated in Figs. 16 to 20 inclusive. A relatively slow drying glue is preferably used to provide the adhesive patches s—s' on the end extensions i and the intermediate extension j of the blank top panel section d, so that the adhesive patches s—s' are still slippery or non-bonding when the top panel sections d—d' of the can loaded blank have been fully infolded by the top panel infolding devices 90 as shown in Fig. 20. As a result, the upper ends of the blank side panels b—b' may be compressed into tight hugging contact with the adjacent side faces of the packaged can group, with lateral sliding adjustment of the infolded top panel sections d—d' before the glue patches s—s' have set, so as to provide a composite top panel of less transverse width than the top end width of the packaged can group.

*Side panel pressure devices*

To insure tight wrapping of the blank side panels b—b' against the opposite sides of the can group, with the upper rim portions c' of the packaged cans projecting through the adjacent slits at the upepr ends of the side panels b—b', and to thereby lock the upper ends of the grouped cans within the wrapper blank, side panel pressure devices 100 are provided which exert inward pressure against the blank side panels b—b' directly adjacent and below the upper score segments f thereof as shown in Fig. 29. The pressure applying devices comprise a pair of pressure chains 101 positioned on opposite sides of the advancing can packages, as shown in Figs. 1, 7 and 13, and whose inner runs 101' are positioned and designed to apply the desired inward pressure to the blank side panels b—b' in registered relation to limited pressure areas p thereof directly below the top score segments f thereof as shown in Fig. 29.

Each pressure chain 101 is composed of a series of overlapping link plates 102 hingedly connected by hinge studs 102' as shown in Figs. 7 and 13. Each pressure chain 101 also incorporates a series of lug plates 103 hingedly connected to adjacent link plates 102 by the hinge studs 102' and which present laterally projecting pressure lugs 103'. The pressure lugs 103' are longitudinally spaced in accordance with the spacing of the top score segments f of the wrapper blank and each presents a pressure face which substantially conforms to the side panel pressure area p shown in Fig. 29. Each pressure chain 101 is supported by an idler sprocket 104 at the front end thereof and a driven sprocket 106 at the tail end thereof.

The sprockets 104 over which the side panel pressure chains 101 are trained are supported by a pair of parallel secondary side beams 161, as shown in Figs. 7, 21 and 22, which extend longitudinally of the apparatus and which may be transversely spaced a lesser distance than the transverse spacing between the main side beams 151 of the main framework 150. The secondary side beams 161 may be supported by a series of paired supporting legs 162 and a pair of end legs 163. The secondary side beams 161 are supported by upper transverse frame members 164 which also provide support for the upper run of the continuing transportation chain supporting rail 27 and the continuing paired rail tracks 38 on which the paired rollers 33 of the blank and package carriers 30 are rollably supported. A series of lower transverse members 165, as shown in Fig. 21, are secured to the paired supporting legs 162 and 163 and also support the adjacent sections of the lower guide channels 28 whose upper inturned flanged portions 28' provide the trackways for the carrier rollers 33 during the return run of the transportation conveyer.

The idler sprockets 104 of the pressure chains 101 are supported from a pair of chain guide members 166 which are secured to the adjacent secondary side beams 161, as is shown in Fig. 7. The vertical stub shaft 104' of each idler sprocket 104 is supported by a pair of fork plates 105 having adjusting slots 105' through which securing bolts 105" extend and which also extend through the adjacent end of the chain guide member 166. The vertical shaft 106' of each driving sprocket 106 extends into an overhead gear box 107. The paired gear boxes 107 are joined by a transverse shaft 107'. Each of the gear boxes 107 contains suitable gearing which provides a driving connection between the sprocket shaft 106' and the transverse shaft 107'. Each of the gear boxes 107 has a base section 107" by means of which it is secured to a pair of overhead transverse frame members 167 supported by leg extensions 162' of one pair of vertical legs 162, as shown in Figs. 7 and 21. One of the sprocket shafts 106' also has a driving connection with the longitudinally extending power transmission shaft 180 which also may be used to drive the head shaft 24 or the tail shaft 24' which respectively support the head sprocket 23 and tail sprocket 23' of the carrier transportation chain 21.

The inner run 101' of each pressure chain 101 travels in a groove 166' found in the adjacent chain guide member 166 and is maintained in blank side panel contacting position by an idler sprocket 108 rotatably mounted on a vertical pintle 108' fixed to a supporting bracket which may be secured to the adjacent end of the chain guide member 166 of the framework as shown in Fig. 7. The inner runs 101' of the pressure chains 101 travel at the same speed as the advancing can packages and are so adjusted that their pressure lugs 103' are maintained in pressure contact with the adjacent vertical blank side panels b—b', a condition which is readily attained by lateral adjustment of the pintles 108' which rotatably support the inner guide sprockets 108. The outer run of each pressure chain 101 is guided and tensioned by an outer guide sprocket 109, rotatively mounted on a vertically extended pintle 109' fixed to the end of a cross bar section 109" which is adjustably secured to the horizontal support flange of the adjacent angle member 166.

The side panel pressure devices 100 operate to apply inward pressure against the limited areas p of the blank side panels b—b' directly below the top score segments f thereof. Since the adhesive patches s—s' have not permanently bonded the overlapping end extensions i—i' and intermediate extensions j—j' of the blank panel sections d—d' when in contact with the inner runs 101' of the pressure chains 101, the top panel sections d—d' may be laterally adjusted so that the overall width of the composite panel formed thereby is of less width than the combined upper end diameters of the transversely arranged cans. Positive locking of the upper rim portions c' of the grouped cans within the upper slits of the side panels of the wrapper blank is thus assured. The pressure lugs 103' on the inner runs of the pressure chains 101 continue to apply inward pressure against the upper ends of the blank side panels after lateral adjustment of the blank top panel sections d—d' has been effected, and also cooperate with sealing pressure devices 110 associated with the apparatus which operates to press the overlapped end extensions i—i' and intermediate extensions j—j' of the top panel section d—d' into firmly bonded relationship.

*Sealing pressure devices*

Devices 110 are provided to apply sealing pressure to the overlapped top panel sections d—d' of the advancing packages directly after the inner runs 101' of the pressure chains 101 have initially exerted compressive pressure as by their pressure lugs 103' to the pressure areas p of the blank side panels as shown in Figs. 1, 1A, 7, a1, 22 and 23. The sealing pressure devices 110 include a pressure belt 111 which extends from a point directly following the head sprockets 104 which support the pressure chains 101, as shown in Fig. 7, to a point substantially adjacent the package discharge end of the apparatus as shown in Fig. 22. The pressure belt 11 extends approximately along the centerline of the traveling can packages, with its lower run 111' in pressure contact with the overfolded handle parts g—g' and adjacent overlapping end extensions i—i' and intermediate extensions j—j' of the top panel sections d—d' of the continuously traveling can packages. The lower run 111' of the pressure belt 111 is driven forwardly at the same speed as the forward travel of the package carriers 30 and the can packages supported thereon.

The head end of the pressure belt 111 is trained around a head roller 112 positioned adjacent the secured ends of the fork plates 105 which support the forward ends of the pressure chain sprockets 104 as shown in Fig. 7. A belt supporting tail roller 112' is positioned adjacent the tail end of the transportation chain 21, as shown in Figs. 21 and 22. Each of the belt supporting rollers 112 and 112' are rotatably mounted on a horizontal axle 113 and each axle is supported by a pair of yoke plates 114 as shown in Figs. 7, 21 and 22. The paired yoke plates 114 are secured as by bolts 114' to the adjacent ends of a longitudinal extending beam 115 which is positioned between the lower and upper runs of the pressure belt 111 as shown in Fig. 21.

The beam 115 is suspended by a series of cross bars 116 whose ends are supported on paired post sections 117 which are secured to the secondary side beams 161 of the framework as shown in Figs. 21 and 22. Each post section 117 has a riser rod 118 secured thereto which extends through a conforming hole in the end of the adjacent cross bar 116 and which carries a vertically adjustable supporting nut 118' on which the adjacent end of the cross bar 116 is supported. A hand knob 118" is threaded to the projecting upper end of each riser rod 118. The longitudinal beam 115 is suspended from the cross bars 116 by a series of hanger plates 119 whose ends overhang the sides of transverse cross bars 116. A pair of suspension bolts 119' extend through the end portions of each hanger plate 119 and are threaded into the longitudinal beam 115. By proper manipulation of the supporting nuts 118' and hand knobs 118", the longitudinal beam 115 and the pressure belt rollers 112 and 112' supported thereby may be vertically adjusted to the height of the packaged cans and in a manner to place the lower run 111' of the pressure belt 111 in pressure contact with the overlapping end extensions i—i' and overlapping intermediate extensions j—j' of the can packages advancing thereunder.

The pressure belt 111 is driven by an overhead belt driving roller 120 as shown in Fig. 21. The overhead belt driving roller 120 is fixed to the roller shaft 107' supported by the gear boxes 107 and driven by the power transmission shaft 180 as above described. Thus the power transmission shaft 180 drives both of the side panel pressure chains 101 and the sealing pressure belt 111 in synchronized union.

Means are provided for maintaining the pressure belt 111 under proper driving tension at all times, and to insure pressure contact between the lower run 111' of the belt and the composite top panel of the traveling packages. The tensioning means comprises a belt tensioning roller 122, as shown in Figs. 7 and 21, around which the upper run of the belt 111 is reversely trained. The belt tensioning roller 122, is rotatively mounted on an axle 122' carried by the spaced legs of a supporting yoke 123. The yoke 123 has a projecting yoke stem 123' which is supported by a pair of longitudinal extending strut sections 124 secured to the lower transverse frame member 167 supported by the adjacent supporting leg extensions 162'. A vertical bearing plate 125 secured to the adjacent ends of the strut sections 124 presents a bearing boss 125' through which the yoke stem 123' extends. A hand knob 123" is threaded on to the projecting end of the yoke stem 123' and may be manipulated to adjust the position of the tensioning roller 122 and thus tension the pressure belt 111 as desired.

The lower run 111' of the pressure belt 111 is firmly pressed against the top face of the overlapped end extensions i—i' and overlapped intermediate extensions j—j' of the inturned top panel sections d—d' of the successive advancing can packages and to thus assure firm adhesive bonding thereof. The means for applying the required downward pressure against the lower run 111' of the pressure belt 111 comprise a series of paired rocker plates 126, as shown in Figs. 21, 22 and 23 which are positioned on opposite sides of the longitudinal beam 115. Each pair of rocker plates 126 supports a pair of longitudinally spaced rocker rollers 127, each of which is rotatably supported on a transverse pintle 127' supported by the paired rocker plates 126. Each pair of rocker plates 126 is rockably supported on a transverse rocker shaft 128 having a vertical stem 128' fixed thereto, as shown in Fig. 23. Each vertical stem 128 extends through a vertical conforming bore in the longitudinal beam 115 and its upper end is rideably supported on the upper face of the beam 115 as by a washer and key combination 128". A compression spring 129 embraces the lower projecting end of each vertical stem 128'. The lower end of the compression spring 129 seats against the adjacent rocker shaft 128 and its upper end extends into a conforming pocket 129' formed in the adjacent lower face of the beam 115.

The paired rocker rollers 127 associated with each pair of rocker plates are designed to roll against the inner face of the lower run 111' of the pressure belt 111 and thus maintain a predetermined downward pressure on the lower run 111' of the belt as induced by the compression spring 129. The top ends of the grouped cans obviously do not present a continuous flat surface, since successive transversely aligned cans of cylindrical form present gaps therebetween, and/or the upper ends of the cans present upwardly projecting chimes, and/or the upper ends of the follower trees fixed to the package carriers are of less height than the packaged cans. The lower run 111' of the flexible belt 111 conforms to the irregular contour presented by the top ends of the successive packages since the rocker rollers 127, as urged by the compression springs 129, associated therewith, execute a vertical rocking or galloping movement as the successive can packages travel thereunder. The sealing pressure devices of this invention thus insure positive adhesive sealing of the overlapped top panel sections d—d' of the can packages irrespective of the contour irregularity of the upper ends thereof.

It will be appreciated that heat sealing adhesive may also be applied to the blank top panel sections d—d', in which case a heat resistant pressure belt 111 of substantial flexibility would be used, with electrical heating elements associated with the rocker plates 126 and rocker rollers 127.

Package kick-out device

A kick-out device 130 is provided which operates to remove each successive package from supported position on the package carriers 30 prior to their advance over the tail sprocket 23' of the transportation conveyer, as shown in Figs. 1A, 21 and 22, and after they have passed beyond the adjacent tail roller 112' which supports the pressure belt 111. The terminal ends of the carrier roller supporting rails 38 and the terminal ends of the track flanges 28' of the lower guide channels 28 are joined by the roller receiving grooves 39" of the arcuate track sections 39' to provide a continuous carrier supporting trackway at the package discharge end of the apparatus. An upper transverse frame member 164 supports the terminal ends of the roller supporting rails 38, and the lower side struts 169 support the bearing blocks 26' of the tail sprocket shaft 24'. The upper transverse member 164 and the lower side struts 169 may be rigidly secured to the end legs 163 of the framework.

An inclined package chute 131 is suitably secured and supported by the adjacent terminal side struts 169 as shown in Fig. 22 and is so inclined as to tilt the can package as it is laterally pushed thereon by the package kick-out device. A package guide rail 132 directs the package into the chute 131 and presents a flared entry end 132' and a diagonal guide section 132" which guides the can package being removed onto the inclined floor of the slide chute 131. The package kick-out device 130 is so positioned that the unloaded carrier 30 immediately preceding the carrier undergoing package removal, is traveling over the upper discharge quadrant of the conveyer sprocket 23' and accordingly presents its follower tree 36 in a forwardly inclined position, as shown in Fig. 21, so that it does not interfere with the removal of the can package from the following carrier platform 31.

The package kick-out device 130 is supported by an angular bracket 133 which may be secured as by bolts 133' to the adjacent transverse frame member 164. The angular bracket 133 supports a kicker arm 134 having an elbow section 134' which is resiliently pressed against the adjacent side of the package during advance thereof. The kicker arm 134 is fixed to a tubular post section 135 rotatably supported by a pivot bolt 136 which extends vertically therethrough and is secured to the horizontal flange of the angular bracket 133. A tension spring 137 embraces the tubular post 135 and has its lower end fixed to the supporting bracket 133 and its upper end fixed to a lug 135' projecting laterally from the tubular post section 135.

The tension spring 137 operates to swing the kicker arm 134 diagonally across the adjacent platform plate 31 of the package carrier and thus push the package seated thereon from the platform plate and into the slide chute 131. The kicker arm 134 is returned to the dot-and-dash line position shown in Fig. 22 when so driven by the adjacent advancing follower tree 36. As soon as the follower tree has advanced out of engagement with the terminal end of the kicker arm 134, the kicker arm is released and swings inwardly against the adjacent side wall of the package supported by the following package carrier and thereupon pushes the package laterally from its supporting platform during continuous forward travel thereof.

The maximum inward swinging movement of the kicker arm 134 as propelled by the tension spring 137 may be adjusted as conditions require, by means of an adjusting screw 139. A supporting leg 138 projecting upwardly from the horizontal flange of the angular bracket 133 has a threaded hole which receives the adjusting screw 139 and whose end is adjusted to limit the swing of the lateral lug 135' projecting from the tubular post section 135 to which the kicker arm 134 is secured. By a suitable manipulation of the adjustable screw 139, the extent of inward swing of the kicker arm 134 may be adjusted in a manner to secure quick and effective kick-out removal of the package from its position on the adjacent advancing carrier platform 31. A lock nut 139' threaded on the adjusting screw 139 may be provided to secure the screw in set position.

As the successive can packages and their supporting carriers advance beyond the influence of the tail roller 112' of the pressure belt 111, the follower tree 36 of the preceding carrier will engage the kicker arm 134 to swing the same outwardly until the follower tree has traveled beyond the terminal end of the kicker arm. The strong tension spring 137 will then immediately swing the released kicker arm 134 against the adjacent side wall of the following package and push it laterally off from its supporting platform and into the discharge chute 131 during continued advance of the package carrier 30. The unloaded carrier then returns to the head end of the apparatus to again receive a glued blank.

Can packaging apparatus constructed in accordance with this invention may be designated and proportioned to package can groups of similar flat-ended cans of any height or diameter, with all of the cans arranged in a single row presenting any desired even number of cans. This apparatus will tightly package can groups whose cylindrical bodies are of uniform diameter and without end chimes, or cans having laterally projecting chimes at the top and/or bottom ends thereof. This apparatus is adapted to operate on various forms of wrapper blanks, and effectively operates to infold and seal the top panel sections of wrapper blank over the can groups seated on the bottom panels thereof and to thereby provide strong composite top panels having paired handle sections, or having no handle sections. This apparatus may also be adapted to use either liquid adhesive or heat and pressure sealing adhesive as desired.

This apparatus operates automatically to produce completed can packages at production speeds of from 100 to 150 can packages per minute. All of the blank and can manipulating mechanisms and devices operate in correlated synchronism, and may be driven from a single power source, or two or more power sources, under the convenient control of the operator. The apparatus operates to tightly enclose successive can groups in the assembled wrapper blanks in a manner so that the contained cans are firmly locked to the side panels of the wrapper blanks. The apparatus requires a limited amount of floor space area, is sturdy and rugged in construction, substantially foolproof in operation, and embraces adjustable features to meet varying operating conditions.

While certain novel features of this invention have been disclosed herein and are pointed out in the claims, it will be understood that various omissions, substitutions and changes may be made by those skilled in the art without departing from the teachings of this invention.

What is claimed is:

1. Apparatus for depositing a can set comprising a row of cans upon the bottom panel of a wrapper blank which includes; a driven conveyer presenting a can supporting platform and a pair of partition members spaced to receive a can set therebetween; means for depositing the bottom panel of a wrapper blank on the conveyer platform; a can supporting floor presenting a can discharge edge extending substantially parallel and adjacent to the line of advance of a side edge of said conveyer platform; a rotatably mounted can loading structure positioned above said can supporting floor and presenting a peripheral section thereof adjacent the can discharge edge of said floor; said structure presenting a set of can-receiving pockets at the periphery thereof operative to advance the pocketed can set during rotation of said structure adjacent to the can discharge edge of said can supporting floor; means for stripping the can set from the pockets of said rotary structure during advance of the can set adjacent the can discharge edge of the can supporting floor, and driving the same off from said can discharge edge and on to the wrapper bottom panel supported on the advancing conveyer platform, and in a position between the partition members of the conveyer; and means for driving said conveyer platforms and rotary can loading structure in cooperating synchronism.

2. Apparatus for depositing a can set comprising a row of cans upon the bottom panel of a wrapper blank which includes; a driven conveyer presenting a can supporting platform and a pair of partition members spaced to receive a can set therebetween; means for depositing the bottom panel of a wrapper blank on the moving conveyer platform; a can supporting floor presenting a can discharge edge extending substantially parallel and adjacent to and slightly above the line of advance of a side edge of said conveyer platform; a rotatably mounted can loading structure positioned above said can supporting floor and presenting a peripheral section thereof adjacent the can discharge edge of said floor, said structure presenting a set of can-receiving pockets at the periphery thereof operative to advance the pocketed can set during rotation of said structure adjacent to the can discharge edge of said can supporting floor; a stripping belt having a section thereof extending substantially parallel to and substantially directly above the can discharge edge of the can supporting floor, said belt section being operative to strip the successive cans of the can set from the pockets of said rotary structure during advance of the can set adjacent said can discharge edge and drive same off from said can discharge edge and on to the wrapper bottom panel supported on the adjacent advancing conveyer platform and in a position between the transverse partition members of the conveyer, and means for driving said conveyer platform, rotary can loading structure and can stripping belt in cooperating synchronism.

3. Apparatus for depositing successive can sets, each set comprising a row of cans equal in number, upon the bottom panels of successive wrapper blanks which includes; a driven conveyer presenting a series of can set supporting platforms and partition members spaced to receive successive can sets therebetween; means for depositing the bottom panels of successive wrapper blanks on the successive advancing conveyer platforms; a can supporting floor presenting a can discharge edge extending substantially parallel and adjacent to the line of advance of a side edge of said conveyer platforms; a rotatably mounted can loading structure positioned above said can supporting floor and presenting a peripheral section thereof adjacent the can discharge edge of said floor, said structure presenting a series of can-receiving pockets at the periphery thereof defined by radially projecting portions designed to group the cans supplied thereto into sets of closely adjacent cans with the following can of one set separated from the lead can of the next adjacent set, said pockets being operative to advance the cans of each set during rotation of said structure adjacent to the can discharge edge of said can supporting floor; means for stripping the successive can sets from the pockets of said rotary structure during advance of the can sets adjacent said can discharge edge of the can supporting floor and driving the same off from said can discharge edge and on to the wrapper bottom panel supported on the adjacent advancing conveyer platform and in a position between the transverse partition members of the conveyer; and means for driving said conveyer platforms and rotary can loading structure in cooperating synchronism.

4. Apparatus for depositing successive can sets, each set comprising a row of cans equal in number, upon the bottom panels of successive wrapper blanks which includes; a driven conveyer presenting a series of can set supporting platforms and partition members spaced to receive successive can sets therebetween; means for depositing the bottom panels of successive wrapper blanks on the successive advancing conveyer platforms; a can supporting floor presenting a can discharge edge extending substantially parallel and adjacent to and slightly above the line of advance of a side edge of said conveyer platform; a rotatably mounted can loading structure positioned above said can supporting floor and presenting a peripheral section thereof adjacent the can discharge edge of said floor, said structure presenting a series of can-receiving pockets at the periphery thereof which are defined by projecting portions designed to group the cans supplied thereto into sets of closely adjacent cans with the following can of one set separated from the lead can of the next adjacent set, said pockets being operative to advance the cans of each set during rotation of said structure adjacent to the can discharge side edge of said can supporting floor; a stripping belt having a section thereof extending substantially parallel to and substantially directly above the can discharge edge of the said can supporting floor, said belt section being operative to strip successive can sets from the pockets of said rotary structure during advance of successive can sets to a position adjacent the can discharge edge of the can supporting floor and drive the same off from said can discharge edge and on to the wrapper bottom panel supported on the adjacent advancing conveyer platform and in a position between the transverse partition members of the conveyer; and means for driving said conveyer platforms, rotary can loading structure and stripping belt in cooperating synchronism.

5. Apparatus for depositing successive can sets, each set comprising a row of cans equal in number, upon the bottom panels of successive wrapper blanks which includes; a driven conveyer presenting a series of can set supporting platforms and partition members spaced to receive successive can sets therebetween; means for depositing the bottom panels of successive wrapper blanks on the successive advancing conveyer platforms; a can supporting floor presenting a can discharge edge extending substantially parallel and adjacent to the line of advance of a side edge of said conveyer platforms; a rotatably mounted can loading structure positioned above said can supporting floor and presenting a peripheral section thereof adjacent the can discharge edge of said floor, said structure presenting a series of can-receiving pockets at the periphery thereof defined by radially projecting portions designed to group the cans supplied thereto into sets of closely adjacent cans with the following can of one set separated from the lead can of the next adjacent set, said pockets being operative to advance the cans of each set during rotation of said structure adjacent to the can discharge edge of said can supporting floor; means for inserting cans in the successive pockets of said rotary structure; means for stripping the successive can sets from the pockets of said rotary structure during advance of the can sets adjacent said can discharge edge of the can supporting floor and driving the same off from said can discharge edge and on to the wrapper bottom panel supported on the adjacent advancing conveyer platform and in a position between the transverse partition members of the conveyer; and means for driving said conveyer platforms and rotary can loading structure in cooperating synchronism.

6. Apparatus for depositing successive can sets, each set comprising a row of cans equal in number, upon the bottom panels of successive wrapper blanks which includes; a driven conveyer presenting a series of can set supporting platforms; means for depositing the bottom panels of successive wrapper blanks on the successive advancing conveyer platforms; a can supporting floor presenting a can discharge edge extending substantially parallel and adjacent to the line of advance of a side edge of said conveyer platforms; a rotatably mounted can loading structure positioned above said can supporting floor and presenting a peripheral section thereof adjacent the can discharge edge of said floor, said structure presenting a series of can-receiving pockets at the periphery thereof defined by radially projecting portions designed to group the cans supplied thereto into sets of closely adjacent cans with the following can of one set separated from the lead can of the next adjacent set, said pockets being operative to advance the cans of each set during rotation of said structure adjacent to the can discharge edge of said can supporting floor; means for removing the successive can sets from the pockets of said rotary structure during advance of the can sets adjacent said can discharge edge of the can supporting floor and depositing the same on to the wrapper bottom panel supported on the adjacent advancing conveyer platform; means for inserting cans in the successive pockets of said rotary structure, said means including a stationary can guiding member presenting a can entry section operative to guide successive cans to the pockets of said rotary structure and a can pocketing section operative to maintain the cans in said pockets during advance thereof to a position adjacent the path of travel of said conveyer platforms, and a can feeding belt positioned opposite the can entry section of said can guiding member and operative to drive the cans positioned therebetween into the successive pockets of said rotary structure; and means for driving said conveyer platforms, rotary can loading structure and can feeding belt in cooperating synchronism.

7. Apparatus for depositing two adjacent can sets upon the bottom panel of a wrapper blank which includes; a driven conveyer presenting a can supporting platform and a pair of transverse partition members spaced to receive two adjacent can sets therebetween; means for depositing the bottom panel of a wrapper blank on the advancing conveyer platform; a can supporting floor on each side of the path of travel of said platform, each of said can supporting floors presenting a can discharge edge extending substantially parallel and adjacent to and slightly above the line of advance of a side edge of said conveyer platform; a rotatably mounted can loading structure positioned on each side of the path of travel of said conveyer platform and positioned above the adjacent can supporting floor and presenting a peripheral section thereof adjacent the can discharge edge of the adjacent floor, each of said rotatable structures presenting a set of can receiving pockets at the periphery thereof operative to advance the can set during rotation of said structure adjacent to the can discharge edge of the can supporting floor therebelow; a pair of can stripping belts each presenting a section thereof extending substantially parallel to and substantially directly above the can discharge edge of the can supporting floor therebelow, said paired belt sections being operative to strip the paired can sets from the pockets of said rotary structures during advance of the can sets to a position adjacent the can discharge edges of the can supporting floors therebelow and thereupon drive the two can sets off from said can discharge edges and on to the wrapper panel supported on the adjacent advancing conveyer platform and into a position between the transverse partition members of the conveyer; and means for driving said conveyer platform, said rotary can loading structures and said can stripping belts in cooperating synchronism.

8. Apparatus for depositing can groups each comprising two adjacent rows of successive can sets upon the bottom panels of successive wrapper blanks which includes; a driven conveyer presenting a series of can supporting platforms and transverse partition members spaced to receive two adjacent rows of successive can sets therebetween; means for depositing the bottom panels of successive wrapper blanks on the successive advancing conveyer platforms; a can supporting floor on each side of the line of advance of said platforms; each of said can supporting floors presenting a can discharge edge extending substantially parallel and adjacent to and slightly above the line of advance of a side edge of said conveyer platforms, a rotatably mounted can loading structure positioned on each side of the path of travel of said conveyer platforms and positioned above the adjacent can supporting floor and presenting a peripheral section thereof adjacent the can discharge edge thereof, each of said rotatable structures presenting a series of can receiving pockets extending around the periphery thereof which are defined by projecting portions designed to assemble the cans supplied thereto into sets of closely adjacent cans with the following can of one set separated from the lead can of the next adjacent set, said pockets being operative to advance the cans of each set during rotation of said structure adjacent to the can discharge edge of the can supporting floor therebelow; a pair of can stripping belts each presenting a section thereof extending substantially parallel to and substantially directly above the can discharge edge of the can supporting floor therebelow, said paired belt sections being operative to strip successive can sets from the pockets of said rotary structures during advance of the successive can sets to a position adjacent said can discharge edges and thereupon drive the paired can sets off from said can discharge edges and on to the wrapper panel supported on the adjacent advancing conveyer platform and between the transverse partition members of the conveyer; and means for driving said conveyer platforms, said rotary can loading structures, and said can stripping belts in cooperating synchronism.

9. Apparatus for depositing successive can sets, each set comprising a row of cans equal in number, upon the bottom panels of successive wrapper blanks which includes; a driven conveyer presenting a series of can set supporting platforms and partition members spaced to receive successive can sets therebetween; means for depositing the bottom panels of successive wrapper blanks on the successive advancing conveyer platforms; a can supporting floor presenting a can discharge edge extending substantially parallel and adjacent to the line of advance of a side edge of said conveyer platforms; a rotatably mounted can loading structure positioned above said can supporting floor and presenting a peripheral section thereof adjacent the can discharge edge thereof, said structure presenting successive sets of can-receiving pockets at the periphery thereof, each of said pocket sets being defined by minor projecting portions and major projecting portions designed to group the cans supplied thereto into sets of closely adjacent cans with the following can of one set separated by a major projecting portion from the lead can of the next adjacent set, said major projecting portions being peripherally spaced a distance which conforms to the linear spacing of said transverse partition members, said pockets being operative to advance the cans of each set during rotation of said structure adjacent to the can discharge edge of said can supporting floor; means for stripping the successive can sets from the pockets of said rotary structure during advance of the can sets adjacent said can discharge edge of the can supporting floor and driving the same off from said can discharge edge and on to the wrapper bottom panel supported on the adjacent advancing conveyer platforms and in a position between the transverse partition members of the conveyer; and means for driving said conveyer platforms and rotary can loading structure in cooperating synchronism.

10. Apparatus for loading successive can sets on successive wrapper blanks which includes; a driven conveyer presenting a series of can set supporting platforms; means for depositing successive wrapper blanks on the successive advancing conveyer platforms; a rotatably mounted can loading structure having a section thereof adjacent the line of travel of said platforms, said can loading structure comprising a pair of vertically spaced disc members presenting paired vertically aligned cavities which define can receiving pockets around the periphery thereof, each set of said pockets being defined by spaced minor projecting portions and a major projecting portion operative to group the cans supplied thereto into sets of closely adjacent cans with the following can of one set separated by a major projecting portion from the lead can of the next adjacent set, said pockets being operative to advance the cans of each set during rotation of said structure to a position adjacent the line of travel of a side edge of said platforms; a stripping belt having a section thereof extending substantially parallel to and substantially directly above the line of travel of said side edge of said platforms, said belt section being operative to strip successive can sets from the pockets of said rotary structure during advance of successive can sets to a position adjacent the line of travel of said side edge of said platforms and drive the same on to the wrapper blank supported on the adjacent advancing conveyer platform, a belt supporting sheave positioned between and rotatable with the paired disc members of said can loading structure, a secondary guide sheave for supporting the can stripping section of said belt, and means for driving said conveyer platforms, rotary can loading structure and stripping belt in cooperating synchronism.

11. Apparatus for loading successive can sets upon the bottom panels of successive wrapper blanks which includes: a driven conveyer presenting a series of can set supporting platforms; means for depositing the bottom panels of successive wrapper blanks on the successive advancing conveyer platforms; a rotatably mounted can loading structure having a section thereof adjacent the line of travel of said platforms, said can loading structure comprising a pair of vertically spaced disc members presenting paired vertically aligned cavities which define can receiving pockets around the periphery thereof, each set of said pockets being defined by one or more paired minor projecting portions and a pair of major projecting portions operative to group the cans supplied thereto into sets of closely adjacent cans with the following can of one set separated by a pair of major projecting portions from the lead can of the next adjacent set, said pockets being operative to advance the cans of each set during rotation of said structure to a position adjacent the line of travel of a side edge of said platforms; a stripping belt having a section thereof extending substantially parallel to and substantially directly above the line of travel of said side edge of said platforms, said belt section being operative to strip successive can sets from the pockets of said rotary structure and drive the same on to the wrapper bottom panel supported on the adjacent advancing conveyer platform, a belt supporting sheave positioned between and rotatable with the paired disc members of said can loading structure, a secondary guide sheave for supporting the can stripping section of said belt, and means for driving said conveyer platforms, rotary can loading structure and stripping belt in cooperating synchronism.

12. Apparatus for loading successive can groups on successive wrapper blanks which includes, a continuous blank and package transportation conveyer presenting a series of can supporting platforms and transverse partition members spaced to receive successive can groups therebetween; rotatably mounted head and tail members supporting said transportation conveyer, a blank transfer conveyer operative to advance the successive blanks to a position over said rotatable head member; means for uniformly adjusting the spacing between successive blanks so that the successive transverse partition members will be projected upwardly between adjacent blanks during up-travel thereof around said head member and so that the successive wrapper blanks will be deposited in registered relation on to the successive platforms and between the transverse partition members of the transportation conveyer, means for depositing successive can groups on the successive wrapper blanks as supported on the advancing platforms, and means for driving said blank transfer conveyer and transportation conveyer in cooperating synchronism.

13. Apparatus for loading successive can groups on successive wrapper blanks which includes; a continuous blank and package transportation conveyer presenting a series of can supporting platforms and transverse partition members spaced to receive successive can groups therebetween; rotatably mounted head and tail members supporting said transportation conveyer, a blank feeding conveyer, means for applying adhesive to each wrapper blank during advance thereof on said blank feeding conveyer, a blank transfer conveyer operative to advance the successive glued blanks from said blank feeding conveyer to a position over said rotatable head member, means for uniformly adjusting the spacing between successive glued blanks so that the successive transverse partition members will be projected upwardly between adjacent blanks during up-travel thereof around said head member and so that the successive wrapper blanks will be deposited in registered relation on to the successive platforms and between the transverse partition members of the transportation conveyer, means for depositing successive can groups on the successive wrapper blanks as supported on the advancing platforms, and means for driving said blank feeding conveyer, glued blank transfer conveyer and transportation conveyer in cooperating synchronism.

14. Apparatus for packaging successive can groups in successive wrapper blanks which present a bottom panel, a pair of side panels and a pair of top panel sections, said apparatus including; a blank and package transportation conveyer presenting a series of can supporting platforms and transverse partition members spaced to receive successive can groups therebetween, rotatably mounted head and tail members supporting said transportation conveyer, a blank transfer conveyer operative to advance successive blanks to a position over said head member, means for guiding the advance movement of said blanks in a manner to align the bottom panels thereof with the line of travel of said transportation platforms, means for uniformly adjusting the spacing between successive blanks so that the successive transverse partition members will be projected upwardly between adjacent blanks during up-travel thereof around said head member and so that the bottom panels of successive wrapper blanks will be deposited in registered relation on to the successive platforms and between the transverse partition members of the transportation conveyer, means for depositing successive can groups on the bottom panels of successive wrapper blanks as supported on the advancing platforms; and means for driving said blank transfer conveyer and transportation conveyer in cooperating synchronism.

15. Apparatus for packaging successive can groups in successive wrapper blanks which present a bottom panel, a pair of side panels and a pair of top panel sections, said apparatus including a blank and package transportation conveyer presenting a series of can supporting platforms and transverse partition members spaced to receive successive can groups therebetween; rotatably mounted head and tail sprockets supporting said transportation conveyer; a blank feeding conveyer; means for applying adhesive to a top panel section of each wrapper blank during advance thereof on said blank feeding conveyer; a blank transfer conveyer operative to advance the successive glued blanks from said blank feeding conveyer to a position over said head sprocket; means for guiding the advance movement of said glued blanks in a manner to align the bottom panels thereof with the line of travel of said transportation platforms; means for uniformly adjusting the spacing between successive glued blanks so that the successive transverse partition members will be projected upwardly between adjacent blanks during up-travel thereof around said head sprocket and so that the bottom panels of successive wrapper blanks will be deposited in registered relation on to the successive platforms and between the transverse partition members of the transportation conveyer; means for depositing successive can groups on the bottom panels of successive wrapper blanks as supported on the advancing platforms; means for upfolding the wrapper side panels over the sides of the blank-seated can groups, means for inturning the top panel sections of the successive wrapper blanks over the top of the seated can groups; means for exerting sealing pressure against the overlapped wrapper top panel sections; and means for driving said blank feeding conveyer, glued blank transfer conveyer, and transportation conveyer in cooperating synchronism.

16. Apparatus for loading can groups in wrapper blanks including; a blank and package transportation conveyer including a continuous conveyer chain, means for driving said conveyer, a series of blank and package supporting platforms each having a follower member projecting from the following end thereof, means hingedly connecting the advance end of each platform to said conveyer chain, rollers mounted on the following end of each of said platforms, and roller supporting tracks for guiding the following ends of said platforms; means for depositing successive wrapper blanks on the advancing platforms of the conveyer, a can loading turret presenting peripherally arranged can loading pockets rotatably mounted on one side of said conveyer along the upper run thereof; and means for stripping the successive cans from said turret pockets and depositing the same on the platform supported wrapper blanks, each of said follower members presenting a trunk section, a pair of arms extending laterally from said trunk section, each pair of adjacent arms being spaced to receive a peripheral section of the adjacent can loading turret therebetween.

17. Apparatus for loading can groups in wrapper blanks including; a blank and package transportation conveyer including a continuous conveyer chain, means for driving said conveyer, a series of blank and package supporting platforms each having a follower member projecting from the following end thereof, means hingedly connecting the advance end of each platform to said conveyer chain, a pair of rollers mounted on the following end of each of said platforms, and continuous roller supporting tracks for guiding the following ends of said platforms; means for depositing successive wrapper blanks on the advancing platforms of the conveyer, a can loading turret presenting peripherally arranged can loading pockets rotatably mounted on one side of said conveyer along the upper run thereof; and means for stripping the successive cans from said turret pockets and depositing the same on the platform supported wrapper blanks; each of said follower members presenting a trunk section and a pair of arms extending laterally from one side of said trunk section with the ends thereof projecting beyond the adjacent side edge of its platform, said pair of adjacent arms being vertically spaced to receive a peripheral section of the adjacent can loading turret therebetween.

18. Apparatus for loading can groups in wrapper blanks including; a blank and package transportation conveyer including a continuous conveyer chain, head and tail sprockets supporting said conveyer chain, means for driving said conveyer, a series of blank and package supporting platforms each having a follower member projecting from the following end thereof, means hingedly connecting the advance end of each platform to said conveyer chain, a pair of rollers mounted on the following end of each of said platforms, and continuous roller supporting tracks extending between and around said sprockets for guiding the following ends of said platforms, means for depositing successive wrapper blanks on the advancing platforms of the conveyer, a can loading turret presenting peripherally arranged can loading pockets rotatably mounted on each side of said conveyer along the upper run thereof; and means for stripping the successive cans from said turret pockets and depositing the same on the advancing platform supported wrapper blanks; each of said follower members presenting a trunk section narrower than the width of the platform to which it is secured, and a pair of arms extending laterally from each side of said trunk section with the ends thereof projecting beyond the adjacent side edge of its platform, each pair of adjacent arms being vertically spaced to receive a peripheral section of the adjacent can loading turret therebetween.

19. Apparatus for enclosing can groups within wrapper blanks each having a bottom panel, a pair of side panels and a pair of top panel sections, said apparatus including; a continuous conveyer including a series of blank supporting platforms each presenting a follower member; means for depositing the bottom panel of successive wrapper blanks on said platforms and between said follower members; means for depositing can groups on the platform supported bottom panels of the successive wrapper blanks and between said follower members; overhead guide bars for aligning the wrapper seated can groups into closely nested relation thereon, means for upfolding the wrapper side panels over the sides of the platform supported can groups during continuous advance thereof; means for infolding the top panel sections of the successive wrapper blanks in overlapping relation over the tops of the successive can groups, and means for exerting sealing pressure against the overlapping top panel sections.

20. Apparatus for enclosing can groups within wrapper blanks each having a bottom panel, a pair of side panels and a pair of top panel sections, said apparatus including; a continuous conveyer including a series of blank supporting platforms each presenting a follower member; means for depositing the bottom panel of successive wrapper blanks on said platforms and between said follower members; means for depositing can groups on the platform supported bottom panels of the successive wrapper blanks and between said follower members; a pair of upfolding belts operative to upfold the wrapper side panels over the sides of the platform supported can groups during continuous advance thereof; means for infolding the top panel sections of the successive wrapper blanks in overlapping relation over the tops of the successive can groups, and means for exerting sealing pressure against the overlapped top panel sections.

21. Apparatus for enclosing can groups within wrapper blanks each having a bottom panel, a pair of side panels and a pair of top panel sections, said apparatus including; a continuous conveyer including a series of blank supporting platforms each presenting a follower member; means for depositing the bottom panel of successive wrapper blanks on said platforms and between said follower members; means for depositing can groups on the platform supported bottom panels of the sucessive wrapper blanks and between said follower members; means for upfolding the wrapper side panels over the sides of the platform supported can groups during continuous advance thereof; means for infolding the top panel sections of the successive wrapper blanks in overlapping relation over the tops of the successive can groups; a pair of continuous pressure members presenting spaced pressure lugs operative to exert inward pressure against the upper portions of the upfolded wrapper side panels in the areas between adjacent cans to thereby contract the width of the composite top panel as formed by the overlapping top panel sections thereof; and means for exerting sealing pressure against the overlapped top panel sections as thus contracted.

22. Apparatus for enclosing can groups within wrapper blanks each having a bottom panel, a pair of side panels and a pair of top panel sections, said apparatus including; a continuous conveyer including a series of blank supporting platforms each presenting a follower member; means for depositing the bottom panel of successive wrapper blanks on said platforms and between said follower members; means for depositing can groups on the platform supported bottom panels of the successive wrapper blanks and between said follower members; a pair of upfolding belts operative to upfold the wrapper side panels over the sides of the platform supported can groups during continuous advance thereof; means for infolding the top panel sections of the successive wrapper blanks in overlapping relation over the tops of the successive can groups; a pair of pressure chains presenting spaced pressure lugs operative to exert inward pressure against the upper portions of the upfolded wrapper side panels in the areas between adjacent cans to thereby contract the width of the composite top panel as formed by the overlapped top panel sections thereof; and means for exerting sealing pressure against the overlapped top panel sections as thus contracted.

23. Apparatus for enclosing can groups within wrapper blanks each having a bottom panel, a pair of side panels and a pair of top panel sections, said apparatus including; a continuous conveyer including a series of blank supporting platforms each presenting a follower member; means for depositing the bottom panel of successive wrapper blanks on said platforms and between said follower members; means for depositing can groups on the platform supported bottom panels of the successive wrapper blanks and between said follower members; overhead guide bars for aligning the wrapper seated can groups into closely nested relation thereon; a pair of upfolding belts operative to upfold the wrapper side panels over the sides of the platform supported can groups during continuous advance thereof; means for infolding the top panel sections of the successive wrapper blanks in overlapping relation over the tops of the successive can groups; a pair of pressure chains presenting spaced pressure lugs operative to exert inward pressure against the upper portions of the upfolded wrapper side panels in the areas between adjacent cans to thereby contract the width of the composite top panel as formed by the overlapped top panel sections thereof; and means for exerting sealing pressure against the overlapped top panel sections as thus contracted.

24. Apparatus for enclosing can groups within wrapper blanks each having a bottom panel, a pair of side panels, a pair of top panel sections and a handle section hinged to each of said top panel sections, said apparatus including; a continuously driven conveyer including a series of blank supporting platforms; means for depositing the bottom panel of successive wrapper blanks on said platforms; means for depositing can groups on the platform supported bottom panels of the successive wrapper blanks; means for upfolding the wrapper side panels over the sides of the platform supported can groups during continuous advance thereof; devices for infolding the top panel sections of the successive wrapper blanks over the tops of the successively advancing can groups, said infolding devices including means for downfolding and infolding one of said top panel sections and substantially simultaneously unfolding and rebend folding its associated handle section in overlying relation thereto, and means for downfolding and infolding the opposite top panel section to thereby place the handle section and adjacent portions thereof in overlapped relation to the handle section and adjacent portions of said first infolded top panel section; and means for exerting sealing pressure against the overlapped top panel sections.

25. Apparatus for enclosing can groups within wrapper blanks each having a bottom panel, a pair of side panels, a pair of top panel sections and a handle section hinged to each of said top panel sections, said apparatus including; a continuously driven conveyer including a series of blank supporting platforms; means for depositing the bottom panel of successive wrapper blanks on said platforms; means for depositing can groups on the platform supported bottom panels of the successive wrapper blanks; means for upfolding the wrapper side panels over the sides of the platform supported can groups during continuous advance thereof; devices for infolding the top panel sections of the successive wrapper blanks over the tops of the successively advancing can groups, said infolding devices including means for downfolding and infolding one of said top panel sections and substantially simultaneously upfolding and rebend folding its associated handle section in overlying relation thereto, and means for downfolding and infolding the opposite top panel section to thereby place the handle section and adjacent portions thereof in overlapped relation to the handle section and adjacent portions of said first infolded top panel section; means for exerting inward pressure against the upper portions of the upfolded wrapper side panels in the areas between adjacent cans to thereby contract the width of the composite top panel as formed by the overlapping top panel section thereof; and means for exerting sealing pressure against the overlapped top panel sections as thus contracted.

26. Apparatus for enclosing can groups within wrapper blanks each having a bottom panel, a pair of side panels, a pair of top panel sections and a handle section hinged to each of said top panel sections, said apparatus including; a continuously driven conveyer including a series of blank supporting platforms; means for depositing the bottom panel of successive wrapper blanks on said platforms; means for depositing can groups on the platform supported bottom panels of the successive wrapper blanks; a pair of upfolding belts operative to upfold the wrapper side panels over the sides of the platform supported can groups during continuous advance thereof; devices for infolding the top panel sections of the successive wrapper blanks over the tops of the successively advancing can groups, said infolding devices including means for downfolding and infolding one of said top panel sections and substantially simultaneously upfolding and rebend folding its associated handle section in overlying relation thereto, and means for downfolding and infolding the opposite top panel section to thereby place the handle section and adjacent portions thereof in overlapped relation to the handle section and adjacent portions of said first infolded top panel section; means for exerting inward pressure against the upper portions of the unfolded wrapper side panels in the areas between adjacent cans to thereby contract the width of the composite top panel as formed by the overlapping top panel section thereof; and means for exerting sealing pressure against the overlapped top panel sections as thus contracted.

27. Apparatus for enclosing can groups within wrapper blanks each having a bottom panel, a pair of side panels and a pair of top panel sections, said apparatus including; a continuously driven conveyer including a series of blank supporting platforms; means for depositing the bottom panel of successive wrapper blanks on said platforms; means for depositing can groups on the platform supported bottom panels of the successive wrapper blanks; means for upfolding the wrapper side panels over the sides of the platform supported can groups during continuous advance thereof; devices for infolding the top panel sections of the successive wrapper blanks over the tops of the successively advancing can groups; and means for exerting sealing pressure against the overlapped top panel sections to provide completed can packages, said sealing means including a driven pressure belt having the lower run thereof extending directly over the line of travel of said overlapped top panel sections, a series of rockably mounted rollers extending along the lower run of said pressure belt and in rolling contact therewith, and resilient means for urging said rollers into pressure contact with the lower run of said pressure belt to thereby uniformly press the lower run of said pressure belt in sealing contact with the overlapped top panel sections of the advancing packages.

28. Apparatus for enclosing can groups within wrapper blanks each having a bottom panel, a pair of side panels and a pair of top panel sections, said apparatus including; a continously driven conveyer including a series of blank supporting platforms; means for depositing the bottom panel of successive wrapper blanks on said platforms; means for depositing can groups on the platform supported bottom panels of the successive wrapper blanks; means for upfolding the wrapper side panels over the sides of the platform supported can groups during continuous advance thereof; devices for infolding the top panel sections of the successive wrapper blanks over the tops of the successively advancing can groups; means for exerting inward pressure against the upper portions of the upfolded wrapper side panels in the areas between adjacent cans to thereby contract the width of the composite top panel as formed by the overlapping top panel section thereof; and means for exerting sealing pressure against the overlapped top panel sections as thus contracted to provide completed can packages, said sealing means including a continuous pressure belt having the lower run thereof extending directly over the line of travel of said overlapped top panel sections, a series of rockably mounted rollers extending along the lower run of said pressure belt and in rolling contact therewith, and resilient means for urging said rollers into pressure contact with the lower run of said pressure belt to thereby uniformly press the lower run of said pressure belt in sealing contact with the overlapped top panel sections of the advancing packages.

29. Can packaging apparatus for enclosing can groups within wrapper blanks each having a bottom panel, a pair of side panels and a pair of top panel sections, said apparatus including; a package forming conveyer including a series of blank supporting platforms and spaced partition members designed to snugly receive successive can groups therebetween, means for depositing the bottom panel of successive wrapper blanks on said platforms and between said partition members; means for depositing can groups on the platform supporting panels of the successive wrapper blanks and between said partition members; means for upfolding the wrapper side panels over the sides of the platform supported can groups during advance thereof; means for infolding the top panel sections of the successive wrapper blanks over the tops of the advancing can groups and sealing the same together to provide completed can packages; and means for successively removing the completed can packages from said conveyer platforms, said means including a package discharge chute adjacent one side of the discharge end of said package forming conveyer, a kicker arm pivotally mounted at the discharge end of said package forming conveyer at the side thereof which is opposite said discharge chute, and resilient means operative to swing the end of said kicker arm into the line of travel of the adjacent can package when the preceding partition member has advanced beyond the end of said kicker arm and whereby the inward swinging movement of the said kicker arm becomes operative to laterally push the adjacent package off from its supporting platform and into said discharge chute.

30. Can packaging apparatus for enclosing can groups within wrapper blanks each having a bottom panel, a pair of side panels and a pair of top panel sections, said apparatus including; a package forming conveyer including a series of blank supporting platforms and spaced partition members designed to snugly receive successive can groups therebetween; means for depositing the bottom panel of successive wrapper blanks on said platforms and between said partition members; means for depositing can groups on the platform supporting panels of the successive wrapper blanks and between said partition members; means for upfolding the wrapper side panels over the sides of the platform supported can groups during advance thereof; devices for infolding the top panel sections of the successive wrapper blanks in lapped relation over the tops of the advancing can groups; means for exerting sealing pressure against the overlapped top panel sections to provide completed can packages; and means for successively removing the completed can packages from said conveyer platforms, said means including a package discharge chute adjacent one side of the discharge end of said package forming conveyer, a kicker arm pivotally mounted at the discharge end of said package forming conveyer at the side thereof which is opposite said discharge chute, and resilient means operative to swing the end of said kicker arm into the line of travel of the adjacent completed package when the preceding partition member has advanced beyond the end of said kicker arm and whereby the inward swinging movement of said kicker arm becomes operative to laterally push the completed package off from its supporting platform and into said discharge chute.

References Cited in the file of this patent

UNITED STATES PATENTS 2,677,221     Currie et al.              May 4, 1954